US012739862B2

(12) United States Patent
Stefanatos et al.

(10) Patent No.: US 12,739,862 B2
(45) Date of Patent: Sep. 15, 2026

(54) TECHNIQUES FOR ENHANCED FEEDBACK AND LINK ADAPTATION FOR SIDELINK GROUPCAST COMMUNICATIONS

(71) Applicant: QUALCOMM Incorporated, San Diego, CA (US)

(72) Inventors: Stelios Stefanatos, San Diego, CA (US); Arthur Gubeskys, San Diego, CA (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 18/579,064

(22) PCT Filed: Jul. 18, 2022

(86) PCT No.: PCT/US2022/037485
§ 371 (c)(1),
(2) Date: Jan. 12, 2024

(87) PCT Pub. No.: WO2023/038714
PCT Pub. Date: Mar. 16, 2023

(65) Prior Publication Data

US 2024/0340932 A1 Oct. 10, 2024

(30) Foreign Application Priority Data

Sep. 10, 2021 (GR) .............................. 20210100597

(51) Int. Cl.
*H04W 72/40* (2023.01)
*H04W 72/25* (2023.01)

(52) U.S. Cl.
CPC .......... *H04W 72/40* (2023.01); *H04W 72/25* (2023.01)

(58) Field of Classification Search
CPC .... H04W 72/40; H04W 72/25; H04L 1/1825; H04L 1/1887; H04L 1/1819;
(Continued)

(56) References Cited

U.S. PATENT DOCUMENTS

2013/0170443 A1 7/2013 He et al.
2020/0092692 A1* 3/2020 Wang .................... H04W 76/14
2021/0051594 A1* 2/2021 Chae ..................... H04L 5/0055
2021/0203456 A1* 7/2021 Zhao ..................... H04L 1/1671
2021/0392639 A1* 12/2021 Lin ....................... H04W 72/00
2022/0167312 A1* 5/2022 Lee ....................... H04L 5/0055
2022/0322365 A1* 10/2022 Yoshioka ................. H04L 1/08
(Continued)

FOREIGN PATENT DOCUMENTS

WO WO-2021071228 A1 4/2021

OTHER PUBLICATIONS

Ericsson: "Resource Allocation for Mode-2 Transmissions", 3GPP TSG-RAN WG1 Meeting #97, R1-1907136, 3rd Generation Partnership Project, Mobile Competence Centre, 650, Route Des Lucioles, F-06921 Sophia-Antipolis, vol. RAN WGI, No. Reno, US, May 13, 2019-May 17, 2019, May 13, 2019, XP051728582, 18 Pages, paragraph [0005]—paragraph [0006], Section 4.3, p. 9-p. 12, figures 7-9.

(Continued)

*Primary Examiner* — Chae S Lee
(74) *Attorney, Agent, or Firm* — Holland & Hart LLP

(57) ABSTRACT

Methods, systems, and devices for wireless communications are described. A first user equipment (UE) may be configured to transmit a first sidelink message via a sidelink channel using a first set of communication parameters, the first sidelink message including data and a reservation for a retransmission resource for retransmission of the first sidelink message. The first UE may receive, from a second UE, a feedback message including a feedback sequence that indicates a negative acknowledgement (NACK) for the first
(Continued)

sidelink message and channel state information (CSI) associated with the sidelink channel. The UE may transmit a second sidelink message including the data of the first sidelink message based on the feedback message, where the second sidelink message is transmitted using a second set of communication parameters, or via at least a second resource different from the retransmission resource, or both.

30 Claims, 13 Drawing Sheets

(58) Field of Classification Search
CPC ................. H04L 1/1861; H04L 5/0044; H04L 5/0055; H04L 2001/0093; H04L 1/0009; H04L 1/0026; H04L 1/1671; H04L 1/0003; H04J 13/004
See application file for complete search history.

(56) References Cited

U.S. PATENT DOCUMENTS

2022/0369346 A1* 11/2022 Xu ........................ H04W 72/20
2023/0421297 A1* 12/2023 Lu ......................... H04L 5/0053

OTHER PUBLICATIONS

Huawei et al., "Sidelink Physical Layer Procedures for NR V2X", 3GPP TSG RAN WG1 Meeting #99, R1-1911887, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, XP051823069, 30 Pages, Section 2.1, 6.6, Section 2.1, Section 3.1, p. 3, figure 2.
International Search Report and Written Opinion—PCT/US2022/037485—ISA/EPO—Nov. 7, 2022 (2106832WO).

* cited by examiner

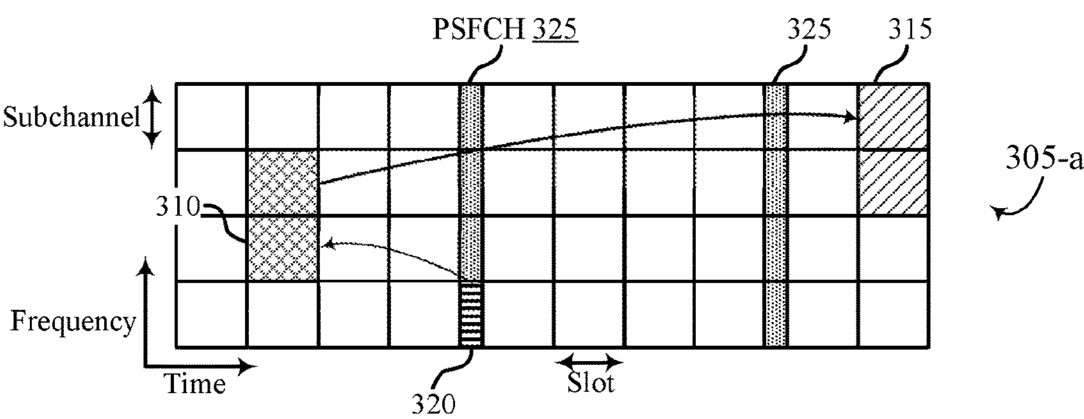
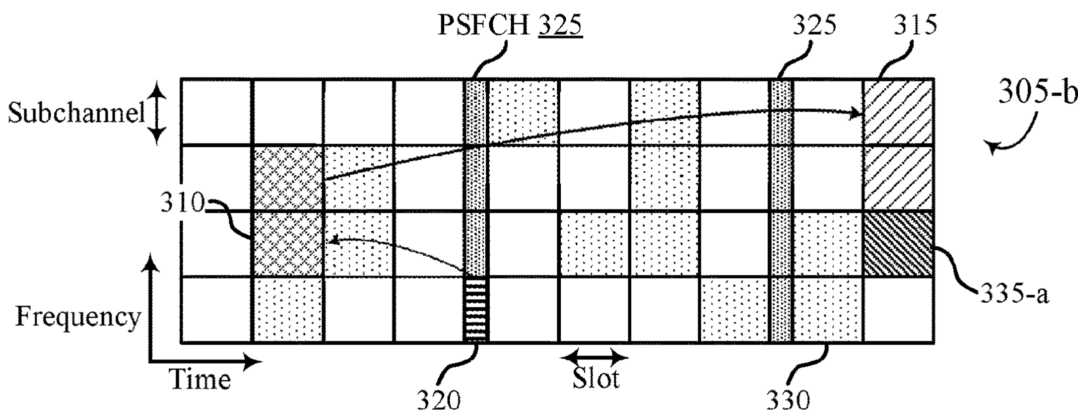
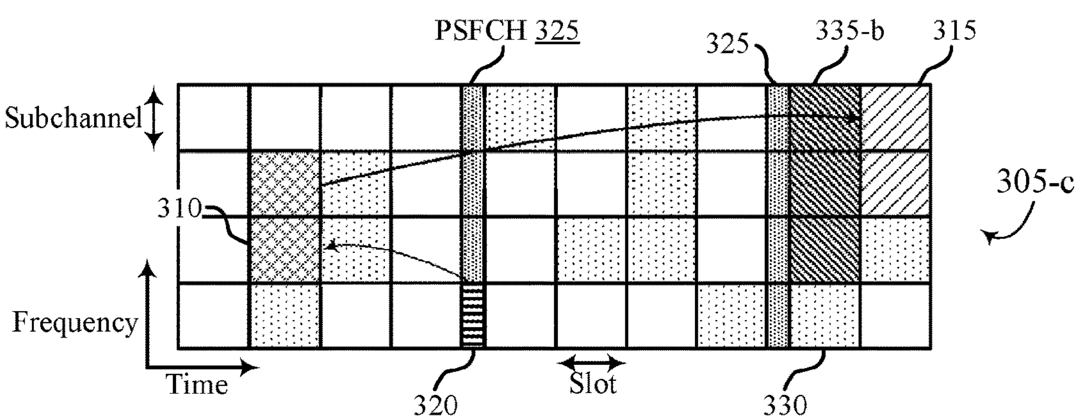
Sidelink Message 310
Retransmission Resource 315
Feedback Message 320
PSFCH 325
Reserved Resources 330
Additional Resource 335
300
FIG. 3

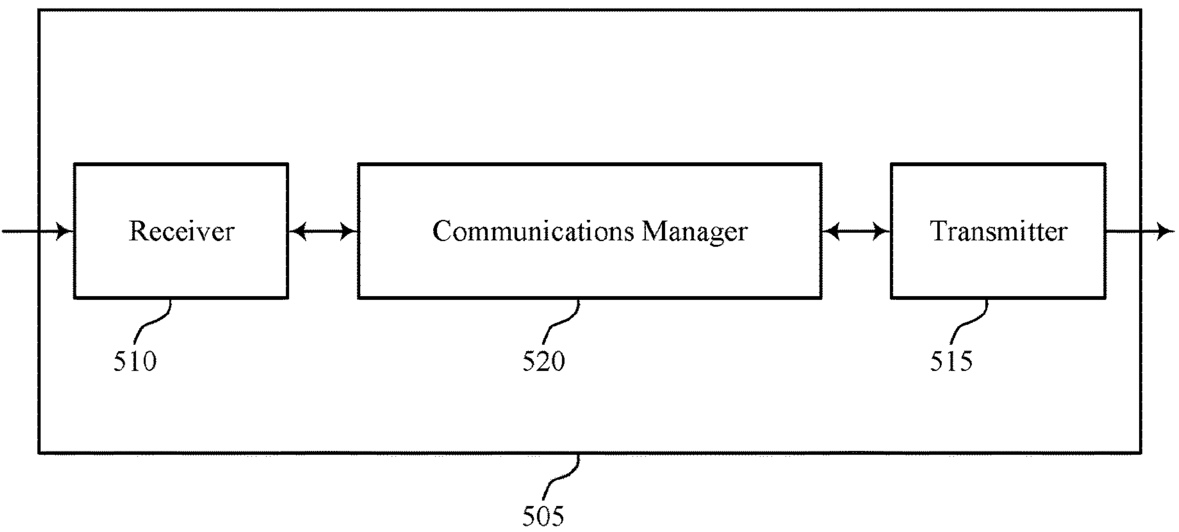
FIG. 5

Figure 9:
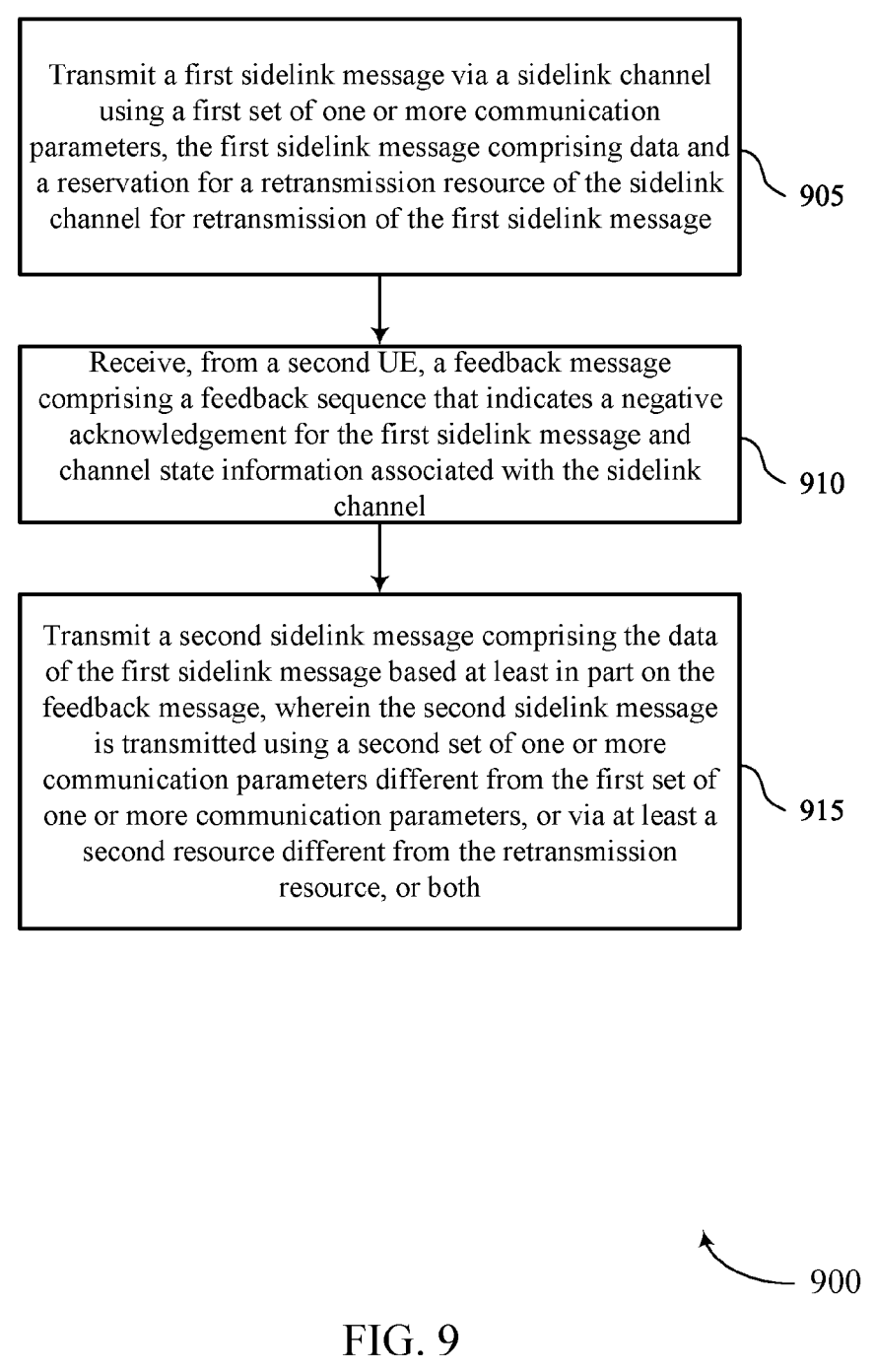

Transmit a first sidelink message via a sidelink channel using a first set of one or more communication parameters, the first sidelink message comprising data and a reservation for a retransmission resource of the sidelink channel for retransmission of the first sidelink message

905

Receive, from a second UE, a feedback message comprising a feedback sequence that indicates a negative acknowledgement for the first sidelink message and channel state information associated with the sidelink channel

910

Transmit a second sidelink message comprising the data of the first sidelink message based at least in part on the feedback message, wherein the second sidelink message is transmitted using a second set of one or more communication parameters different from the first set of one or more communication parameters, or via at least a second resource different from the retransmission resource, or both

TECHNIQUES FOR ENHANCED FEEDBACK AND LINK ADAPTATION FOR SIDELINK GROUPCAST COMMUNICATIONS

CROSS REFERENCE

The present application is a 371 national stage filing of International PCT Application No. PCT/US2022/037485 by STEFANATOS et al. entitled "TECHNIQUES FOR ENHANCED FEEDBACK AND LINK ADAPTATION FOR SIDELINK GROUPCAST COMMUNICATIONS," filed Jul. 18, 2022; and claims priority to Greece Patent Application No. 20210100597 by STEFANATOS et al., entitled "TECHNIQUES FOR ENHANCED FEEDBACK AND LINK ADAPTATION FOR SIDELINK GROUPCAST COMMUNICATIONS," filed Sep. 10, 2021, each of which is assigned to the assignee hereof, and each of which is expressly incorporated by reference in its entirety herein.

FIELD OF TECHNOLOGY

The following relates to wireless communications, including techniques for enhanced feedback and link adaptation for sidelink groupcast communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support sidelink communications between UEs. However, some feedback mechanisms for sidelink communications are deficient, and may result in less reliable sidelink communications.

SUMMARY

The described techniques relate to improved methods, systems, devices, and apparatuses that support techniques for enhanced feedback and link adaptation for sidelink groupcast communications. Generally, the described techniques provide for enhanced feedback mechanisms in the context of sidelink groupcast communications. In particular, techniques described herein may enable a receiving (Rx) user equipment (UE) to transmit enhanced feedback messages in response to sidelink groupcast messages, where the enhanced feedback messages indicate both a negative acknowledgement (NACK) and an indication of channel state information (CSI) for a channel between the transmitting (Tx) UE and the Rx UE. In particular, the feedback message may include a feedback sequence which jointly indicates the NACK and the CSI, or a feedback sequence which is a superposition of a NACK sequence and a CSI sequence. By providing the Tx UE an indication of CSI, the Tx UE may be able to selectively modify communication parameters (e.g., modulation and coding scheme (MCS)) and/or resources used to perform retransmissions in order to improve the likelihood that retransmissions will be successfully decoded by the Rx UEs requesting the retransmission(s). For example, upon receiving an enhanced feedback message which indicates a CSI corresponding to poor channel conditions, a Tx UE may retransmit a sidelink groupcast message using a lower MCS to increase redundancy. Additionally, or alternatively, the Tx UE may adjust resources used to perform retransmissions based on CSI received within enhanced feedback messages.

A method for wireless communication at a first UE is described. The method may include transmitting a first sidelink message via a sidelink channel using a first set of one or more communication parameters, the first sidelink message including data and a reservation for a retransmission resource of the sidelink channel for retransmission of the first sidelink message, receiving, from a second UE, a feedback message including a feedback sequence that indicates a NACK for the first sidelink message and CSI associated with the sidelink channel, and transmitting a second sidelink message including the data of the first sidelink message based on the feedback message, where the second sidelink message is transmitted using a second set of one or more communication parameters different from the first set of one or more communication parameters, or via at least a second resource different from the retransmission resource, or both.

An apparatus for wireless communication at a first UE is described. The apparatus may include a processor, memory coupled with the processor, and instructions stored in the memory. The instructions may be executable by the processor to cause the apparatus to transmit a first sidelink message via a sidelink channel using a first set of one or more communication parameters, the first sidelink message including data and a reservation for a retransmission resource of the sidelink channel for retransmission of the first sidelink message, receive, from a second UE, a feedback message including a feedback sequence that indicates a NACK for the first sidelink message and CSI associated with the sidelink channel, and transmit a second sidelink message including the data of the first sidelink message based on the feedback message, where the second sidelink message is transmitted using a second set of one or more communication parameters different from the first set of one or more communication parameters, or via at least a second resource different from the retransmission resource, or both.

Another apparatus for wireless communication at a first UE is described. The apparatus may include means for transmitting a first sidelink message via a sidelink channel using a first set of one or more communication parameters, the first sidelink message including data and a reservation for a retransmission resource of the sidelink channel for retransmission of the first sidelink message, means for receiving, from a second UE, a feedback message including a feedback sequence that indicates a NACK for the first sidelink message and CSI associated with the sidelink channel, and means for transmitting a second sidelink message including the data of the first sidelink message based on the feedback message, where the second sidelink message is transmitted using a second set of one or more communication parameters different from the first set of one or more communication parameters, or via at least a second resource different from the retransmission resource, or both.

A non-transitory computer-readable medium storing code for wireless communication at a first UE is described. The code may include instructions executable by a processor to transmit a first sidelink message via a sidelink channel using a first set of one or more communication parameters, the first sidelink message including data and a reservation for a retransmission resource of the sidelink channel for retransmission of the first sidelink message, receive, from a second UE, a feedback message including a feedback sequence that indicates a NACK for the first sidelink message and CSI associated with the sidelink channel, and transmit a second sidelink message including the data of the first sidelink message based on the feedback message, where the second sidelink message is transmitted using a second set of one or more communication parameters different from the first set of one or more communication parameters, or via at least a second resource different from the retransmission resource, or both.

Some examples of the method, apparatuses, and non-transitory computer-readable medium described herein may further include operations, features, means, or instructions for receiving, via the feedback message, the feedback sequence that may be a superposition of a negative acknowledgment sequence and a CSI sequence selected from a set of multiple CSI sequences, where the CSI sequence indicates the CSI.

Some examples of the method, apparatuses, and non-transitory computer-readable medium described herein may further include operations, features, means, or instructions for receiving, from a base station, control signaling indicating a set of feedback sequences for feedback messages associated with sidelink communications, where the set of feedback sequences includes the feedback sequence, and where each feedback sequence in the set of feedback sequences indicates the NACK and a different CSI report from a set of multiple CSI reports.

In some examples of the method, apparatuses, and non-transitory computer-readable medium described herein, each CSI sequence of the set of multiple CSI sequences may be orthogonal to the NACK sequence and each CSI sequence of the set of multiple CSI sequences corresponds to a respective CSI report from a set of multiple CSI reports associated with the sidelink channel.

In some examples of the method, apparatuses, and non-transitory computer-readable medium described herein, the feedback sequence jointly indicates the NACK and the CSI and the feedback sequence includes a superposition of a NACK sequence and a CSI sequence.

Some examples of the method, apparatuses, and non-transitory computer-readable medium described herein may further include operations, features, means, or instructions for transmitting, to the second UE, an indication of a capability of the first UE to receiving feedback messages including both feedback and CSI, where receiving the feedback message may be based on transmitting the indication of the capability.

Some examples of the method, apparatuses, and non-transitory computer-readable medium described herein may further include operations, features, means, or instructions for transmitting the indication of the capability via a sidelink control information (SCI) portion of the first sidelink message, a medium access control-control element (MAC-CE) message, or any combination thereof.

In some examples of the method, apparatuses, and non-transitory computer-readable medium described herein, the first set of one or more communication parameters includes a first modulation and coding scheme (MCS) and the method, apparatuses, and non-transitory computer-readable medium may include further operations, features, means, or instructions for transmitting the second sidelink message using a second MCS which may be different from the first MCS, where the second set of one or more communication parameters includes the second MCS.

Some examples of the method, apparatuses, and non-transitory computer-readable medium described herein may further include operations, features, means, or instructions for transmitting the second sidelink message using the second MCS based on the second MCS enabling the second sidelink message to be transmitted within the retransmission resource for retransmissions of the first sidelink message, where the second MCS may be identified from a set of multiple candidate MCSs based on the CSI within the feedback message.

Some examples of the method, apparatuses, and non-transitory computer-readable medium described herein may further include operations, features, means, or instructions for transmitting the second sidelink message within at least a portion of the retransmission resource and at least a portion of the second resource, where the second resource may be adjacent to a boundary of the retransmission resource in a frequency domain.

Some examples of the method, apparatuses, and non-transitory computer-readable medium described herein may further include operations, features, means, or instructions for transmitting the second sidelink message via the second resource based on identifying that one or more resources which may be adjacent to the retransmission resource in a frequency domain may have been reserved by another UE.

In some examples of the method, apparatuses, and non-transitory computer-readable medium described herein, the second resource may be separated from the retransmission resource in the frequency domain by one or more subchannels and the second resource may be associated with a different set of time resources relative to the retransmission resource, or both.

In some examples of the method, apparatuses, and non-transitory computer-readable medium described herein, the first sidelink message, the second sidelink message, or both, includes a sidelink groupcast message which may be transmitted to a set of multiple UEs including the second UE.

A method for wireless communication at a second UE is described. The method may include receiving, from a first UE, a first sidelink message via a sidelink channel using a first set of one or more communication parameters, the first sidelink message including data and a reservation for a retransmission resource of the sidelink channel for retransmission of the first sidelink message, transmitting, to the first UE, a feedback message including a feedback sequence that indicates a NACK for the first sidelink message and CSI associated with the sidelink channel, and receiving, from the first UE, a second sidelink message including the data of the first sidelink message based on the feedback message, where the second sidelink message is received using a second set of one or more communication parameters different from the first set of one or more communication parameters, or via at least a second resource different from the retransmission resource, or both.

An apparatus for wireless communication at a second UE is described. The apparatus may include a processor, memory coupled with the processor, and instructions stored in the memory. The instructions may be executable by the processor to cause the apparatus to receive, from a first UE, a first sidelink message via a sidelink channel using a first set of one or more communication parameters, the first sidelink message including data and a reservation for a retransmission resource of the sidelink channel for retransmission of the first sidelink message, transmit, to the first UE, a feedback message including a feedback sequence that indicates a NACK for the first sidelink message and CSI associated with the sidelink channel, and receive, from the first UE, a second sidelink message including the data of the first sidelink message based on the feedback message, where the second sidelink message is received using a second set of one or more communication parameters different from the first set of one or more communication parameters, or via at least a second resource different from the retransmission resource, or both.

Another apparatus for wireless communication at a second UE is described. The apparatus may include means for receiving, from a first UE, a first sidelink message via a sidelink channel using a first set of one or more communication parameters, the first sidelink message including data and a reservation for a retransmission resource of the sidelink channel for retransmission of the first sidelink message, means for transmitting, to the first UE, a feedback message including a feedback sequence that indicates a NACK for the first sidelink message and CSI associated with the sidelink channel, and means for receiving, from the first UE, a second sidelink message including the data of the first sidelink message based on the feedback message, where the second sidelink message is received using a second set of one or more communication parameters different from the first set of one or more communication parameters, or via at least a second resource different from the retransmission resource, or both.

A non-transitory computer-readable medium storing code for wireless communication at a second UE is described. The code may include instructions executable by a processor to receive, from a first UE, a first sidelink message via a sidelink channel using a first set of one or more communication parameters, the first sidelink message including data and a reservation for a retransmission resource of the sidelink channel for retransmission of the first sidelink message, transmit, to the first UE, a feedback message including a feedback sequence that indicates a NACK for the first sidelink message and CSI associated with the sidelink channel, and receive, from the first UE, a second sidelink message including the data of the first sidelink message based on the feedback message, where the second sidelink message is received using a second set of one or more communication parameters different from the first set of one or more communication parameters, or via at least a second resource different from the retransmission resource, or both.

Some examples of the method, apparatuses, and non-transitory computer-readable medium described herein may further include operations, features, means, or instructions for transmitting, via the feedback message, the feedback sequence that may be a superposition of a NACK sequence and a CSI sequence selected from a set of multiple CSI sequences, where the CSI sequence indicates the CSI.

Some examples of the method, apparatuses, and non-transitory computer-readable medium described herein may further include operations, features, means, or instructions for receiving, from a base station, control signaling indicating a set of feedback sequences for feedback messages associated with sidelink communications, where the set of feedback sequences includes the feedback sequence, and where each feedback sequence in the set of feedback sequences indicates the NACK and a different CSI report from a set of multiple CSI reports.

In some examples of the method, apparatuses, and non-transitory computer-readable medium described herein, each CSI sequence of the set of multiple CSI sequences may be orthogonal to the NACK sequence and each CSI sequence of the set of multiple CSI sequences corresponds to a respective CSI report from a set of multiple CSI reports associated with the sidelink channel.

In some examples of the method, apparatuses, and non-transitory computer-readable medium described herein, the feedback sequence jointly indicates the NACK and the CSI and the feedback sequence includes a superposition of a NACK sequence and a CSI sequence.

Some examples of the method, apparatuses, and non-transitory computer-readable medium described herein may further include operations, features, means, or instructions for receiving, from the first UE, an indication of a capability of the first UE to receiving feedback messages including both feedback and CSI, where transmitting the feedback message may be based on transmitting the indication of the capability.

Some examples of the method, apparatuses, and non-transitory computer-readable medium described herein may further include operations, features, means, or instructions for receiving the indication of the capability via an SCI portion of the first sidelink message, a MAC-CE message, or any combination thereof.

In some examples of the method, apparatuses, and non-transitory computer-readable medium described herein, the first set of one or more communication parameters includes a first MCS and the method, apparatuses, and non-transitory computer-readable medium may include further operations, features, means, or instructions for receiving the second sidelink message using a second MCS which may be different from the first MCS, where the second set of one or more communication parameters includes the second MCS.

Some examples of the method, apparatuses, and non-transitory computer-readable medium described herein may further include operations, features, means, or instructions for receiving the second sidelink message using the second MCS based on the second MCS enabling the second sidelink message to be transmitted within the retransmission resource for retransmissions of the first sidelink message, where the second MCS may be identified from a set of multiple candidate MCSs based on the CSI within the feedback message.

Some examples of the method, apparatuses, and non-transitory computer-readable medium described herein may further include operations, features, means, or instructions for receiving the second sidelink message within at least a portion of the retransmission resource and at least a portion of the second resource, where the second resource may be adjacent to a boundary of the retransmission resource in a frequency domain.

Some examples of the method, apparatuses, and non-transitory computer-readable medium described herein may further include operations, features, means, or instructions for receiving the second sidelink message via the second resource based on identifying that one or more resources which may be adjacent to the retransmission resource in a frequency domain may have been reserved by another UE.

In some examples of the method, apparatuses, and non-transitory computer-readable medium described herein, the second resource may be separated from the retransmission resource in the frequency domain by one or more subchannels and the second resource may be associated with a different set of time resources relative to the retransmission resource, or both.

In some examples of the method, apparatuses, and non-transitory computer-readable medium described herein, the first sidelink message, the second sidelink message, or both, includes a sidelink groupcast message which may be transmitted by the first UE to a set of multiple UEs including the second UE.

BRIEF DESCRIPTION OF THE DRAWINGS

FIG. 3 illustrates an example of a resource configuration that supports techniques for enhanced feedback and link adaptation for sidelink groupcast communications in accordance with aspects of the present disclosure.

FIGS. 5 and 6 show block diagrams of devices that support techniques for enhanced feedback and link adaptation for sidelink groupcast communications in accordance with aspects of the present disclosure.

FIGS. 9 through 13 show flowcharts illustrating methods that support techniques for enhanced feedback and link adaptation for sidelink groupcast communications in accordance with aspects of the present disclosure.

DETAILED DESCRIPTION

Figure 1:
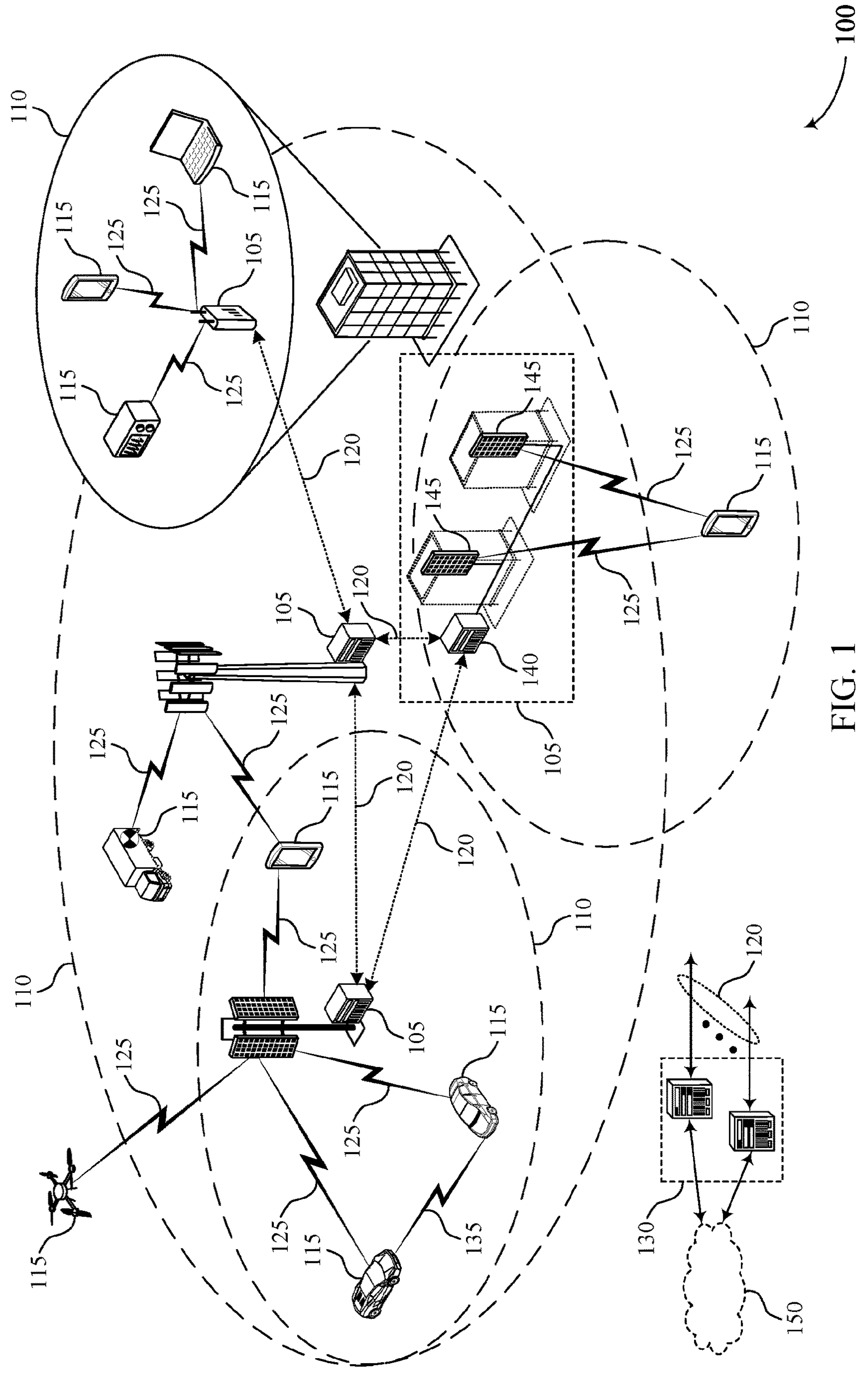
FIG. 1 illustrates an example of a wireless communications system that supports techniques for enhanced feedback and link adaptation for sidelink groupcast communications in accordance with aspects of the present disclosure.

Some wireless communications systems may support sidelink communications between user equipments (UEs). Some wireless communications systems may support unicast sidelink communications (e.g., one transmitting (Tx) UE to one receiving (Rx) UE), as well as sidelink groupcast communications (e.g., one Tx UE to many Rx UEs). In the context of sidelink groupcast communications, Rx UEs may transmit feedback messages which indicate a negative-acknowledgement (NACK), without any indication of channel quality (e.g., NACK-only feedback). Upon receiving a NACK message in response to a sidelink groupcast message, the Tx UE may re-transmit an identical sidelink message using the same communications parameters (e.g., same modulation and coding scheme (MCS)) as the original sidelink message. The series of identical sidelink retransmissions may reduce the likelihood that Rx UEs will experience decoding failures due to collisions with other sidelink messages, but may not improve a likelihood that subsequent sidelink messages (retransmissions) will be successfully decoded at the Rx UEs when there are poor channel conditions between the Tx UE and the Rx UE, such as channel fading, blockage, and other interference. In other words, without any knowledge of the channel between the Tx UE and the Rx UEs, the Tx UE may transmit an identical sidelink message which is likely to suffer from the same poor channel conditions which necessitated the retransmission.

Accordingly, aspects of the present disclosure are directed to techniques for enhanced feedback mechanisms in the context of sidelink groupcast communications. In particular, techniques described herein enable Rx UEs to transmit enhanced feedback messages in response to sidelink groupcast messages, where the enhanced feedback messages include both (1) a NACK, and (2) an indication of channel state information (CSI) for a channel between the Tx UE and the Rx UE. In particular, the feedback message may include a feedback sequence which jointly indicates the NACK and the CSI, or a feedback sequence which is a superposition of a NACK sequence and a CSI indication/sequence. The terms "CSI," "channel quality indicator (CQI)," and like terms, may be used interchangeably for the purposes of the present disclosure, unless noted otherwise herein.

By providing the Tx UE an indication of CSI, the Tx UE may be able to selectively modify communication parameters (e.g., MCS) and/or resources used to perform retransmissions in order to improve the likelihood that retransmissions will be successfully decoded by the Rx UEs requesting the retransmission(s). For example, upon receiving an enhanced feedback message which indicates a CSI corresponding to poor channel conditions, a Tx UE may retransmit a sidelink groupcast message using a lower MCS to increase redundancy. Additionally, or alternatively, the Tx UE may adjust resources used to perform retransmissions based on CSI received within enhanced feedback messages.

In some aspects, a network may configure UEs with a codebook of feedback sequences. In some aspects, the codebook may include a codebook of feedback sequences which jointly indicate a NACK and CSI. Additionally, or alternatively, the codebook may include a legacy NACK sequence and a set of CSI sequences. The legacy NACK sequence may enable legacy UEs to identify a NACK within enhanced feedback messages, and each respective feedback sequence may be indicative of a different CSI value to enable improved channel knowledge at the Tx UE (e.g., in cases where the Tx UE is aware of the enhanced feedback mechanism and codebook). Moreover, the Tx UE may explicitly signal to Rx UEs that it is capable of receiving enhanced feedback messages.

Aspects of the disclosure are initially described in the context of wireless communications systems. Additional aspects of the disclosure are described in the context of an example resource configuration and an example process flow. Aspects of the disclosure are further illustrated by and described with reference to apparatus diagrams, system diagrams, and flowcharts that relate to techniques for enhanced feedback and link adaptation for sidelink groupcast communications.

FIG. 1 illustrates an example of a wireless communications system 100 that supports techniques for enhanced feedback and link adaptation for sidelink groupcast communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and Ns may represent the maximum supported discrete Fourier transform (DFT) size. Time intervals of a communications resource may be organized according to radio frames each having a specified duration (e.g., 10 milliseconds (ms)). Each radio frame may be identified by a system frame number (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting.

MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, the UEs 115 and the base stations 105 of the wireless communications system 100 may support techniques for enhanced feedback mechanisms in the context of sidelink groupcast communications. In particular, techniques described herein enable Rx UEs 115 of the wireless communications system 100 to transmit enhanced feedback messages in response to sidelink groupcast messages, where the enhanced feedback messages include both (1) a NACK, and (2) an indication of CSI for a channel between a Tx UE 115 and the Rx UE 115. In particular, the feedback message may include a feedback sequence which jointly indicates the NACK and the CSI (e.g., NACK+CSI sequence), or a feedback sequence which is a superposition of a NACK sequence and a CSI sequence (e.g., NACK sequence+CSI sequence). In some examples, the feedback sequence may be the same as the CSI sequence. By providing the Tx UE an indication of CSI, the Tx UE 115 may be able to selectively modify communication parameters (e.g., MCS) and/or resources used to perform retransmissions in order to improve the likelihood that retransmissions will be successfully decoded by the Rx UEs 115.

For example, a Tx UE 115 of the wireless communications system 100 transmit a first sidelink message (e.g., sidelink groupcast message) to a set of Rx UEs 115. The Tx UE 115 may transmit the first sidelink message using a first set of communication parameters (e.g., first MCS), where the first sidelink message reserves a set of resources for retransmissions of the first sidelink message. An Rx UE 115 may determine that it was unable to successfully receive and/or decode the first sidelink message, and may transmit an enhanced feedback message to the Tx UE 115 which includes a NACK and CSI associated with a channel between the Tx UE 115 and the Rx UE 115. The feedback message may include a feedback sequence which jointly indicates the NACK and the CSI (e.g., NACK+CSI sequence), or a feedback sequence which is a superposition of two sequences of equal length: (1) a NACK sequence, and (2) a CSI sequence (e.g., NACK sequence+CSI sequence). Upon receiving the enhanced feedback message which indicates a CSI corresponding to poor channel conditions, the Tx UE 115 may retransmit a sidelink groupcast message using a lower MCS to increase redundancy. Additionally, or alternatively, the Tx UE 115 may adjust resources used to perform the retransmission based on CSI received within enhanced feedback messages (e.g., use alternative or additional resources as compared to the resources which were originally reserved for retransmissions).

In some aspects, the network of the wireless communications system 100 (e.g., base stations 105) may configure UEs 115 with a codebook of feedback sequences. In some aspects, the codebook may include a codebook of feedback sequences which jointly indicate a NACK and CSI (e.g., codebook of NACK+CSI sequences). Additionally, or alternatively, the codebook may include a legacy NACK sequence and a set of CSI sequences. The legacy NACK sequence may enable legacy UEs 115 to identify a NACK within enhanced feedback messages, and each respective feedback sequence may be indicative of a different CSI value to enable improved channel knowledge at the Tx UE 115. Moreover, the Tx UE 115 may explicitly signal to Rx UEs 115 that it is capable of receiving enhanced feedback messages.

Techniques described herein may enable the use of enhanced feedback signaling mechanisms for sidelink communications. In particular, by enabling Rx UEs 115 to include CSI within feedback messages transmitted in response to sidelink groupcast messages, techniques described herein may facilitate improved channel knowledge at the Tx UE 115, thereby enabling Tx UEs 115 to adjust parameters (e.g., MCS) and/or resources used for sidelink retransmissions to improve a probability that retransmissions will be successfully received and decoded at Rx UEs 115. As such, techniques described herein may lead to more effective and reliable sidelink communications, as well as improved utilization of sidelink resources.

Figure 2:
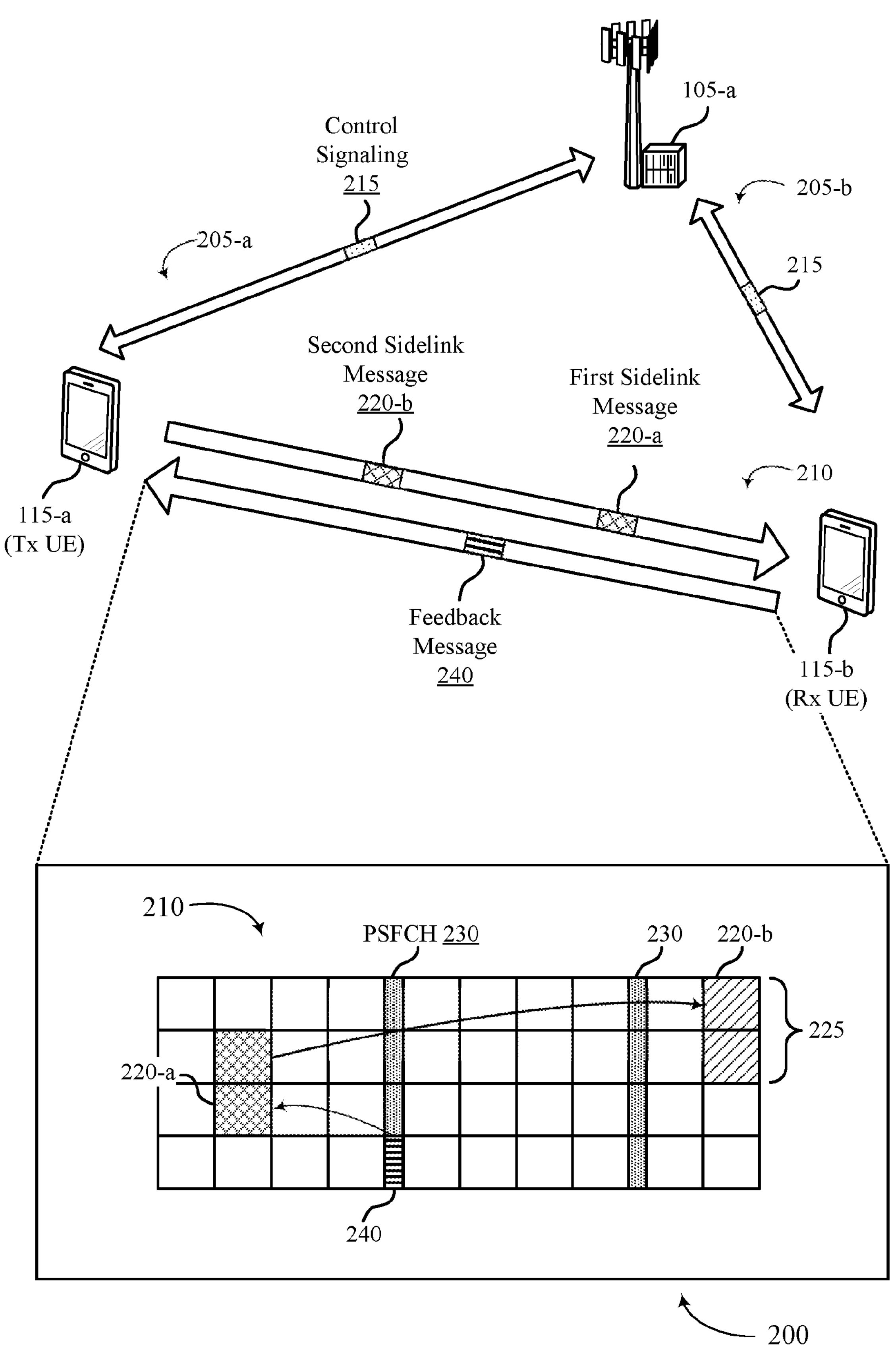
FIG. 2 illustrates an example of a wireless communications system that supports techniques for enhanced feedback and link adaptation for sidelink groupcast communications in accordance with aspects of the present disclosure.

FIG. 2 illustrates an example of a wireless communications system 200 that supports techniques for enhanced feedback and link adaptation for sidelink groupcast communications in accordance with aspects of the present disclosure. In some examples, wireless communications system 200 may implement, or be implemented by, aspects of wireless communications system 100. For example, wireless communications system 200 may support enhanced feedback mechanisms for sidelink communications, as described in FIG. 1.

The wireless communications system 200 may include a base station 105-*a*, a first UE 115-*a*, and a second UE 115-*b*, which may be examples base stations 105 and UEs 115 as described with reference to FIG. 1. The first UE 115-*a* and the second UE 115-*b* may communicate with the base station 105-*a* using communication links 205-*a* and 205-*b*, respectively, which may be examples of NR or LTE links between the UEs 115-*a*, 115-*b* and the base station 105-*a*. In some cases, the communication links 205-*a*, 205-*b* between the UEs 115-*a*, 115-*b* and the base station 105-*a* may include examples of access links (e.g., Uu links) which may include bi-directional links that enable both uplink and downlink communication. For example, the first UE 115-*a* may transmit uplink signals, such as uplink control signals or uplink data signals (e.g., physical uplink shared channel (PUSCH) transmissions), to the base station 105-*a* using the communication link 205-*a*, and the base station 105-*a* may transmit downlink signals, such as downlink control signals or downlink data signals, to the first UE 115-*a* using the communication link 205-*a*. Moreover, in some aspects, the first UE 115-*a* and the second UE 115-*b* may communicate with one another using a communication link 210, which may be an example of a sidelink communication link or PC5 link.

As noted previously herein, some wireless communications systems may support unicast sidelink communications (e.g., one Tx UE 115 to one Rx UE 115), as well as sidelink groupcast communications (e.g., one Tx UE 115 to many Rx UEs 115). In the context of sidelink groupcast communications, Rx UEs 115 may transmit feedback messages which indicate a NACK without any indication of channel quality (e.g., NACK-only feedback). In particular, some wireless communications systems do not support CSI reporting in the context of sidelink groupcast option 1 communications, which may be particularly useful in the context of V2X communications. For sidelink groupcast option 1 communications, a Tx UE 115 may transmit or broadcast a sidelink message/signal which requests that Rx UEs 115 which do not decode the sidelink message and which are within a certain distance of the Tx UE 115 (e.g., "NACK distance") to respond with NACK feedback, where the NACK feedback may trigger retransmission of the sidelink message. In some cases, the resources for the NACK feedback may be pre-configured (e.g., the resources for the NACK feedback may depend on the Tx UE 115 identifier and the resources used for the sidelink message to which the NACK feedback corresponds).

In the context of sidelink groupcast option 1 communications, each Rx UE 115 which does not successfully receive and/or decode the original sidelink message and which are within the indicated NACK distance may transmit the same exact feedback message (e.g., may transmit the same NACK sequence within the same physical sidelink feedback channel (PSFCH) resources). As such, the Tx UE 115 will effectively receive a superposition of NACK feedback messages as a single NACK transmission (e.g., via a single frequency network (SFN) transmission). If no NACK is received or observed by the Tx UE 115, the Tx UE 115 may be configured to assume that all Rx UEs 115 within the NACK distance (if any) successfully decoded the original sidelink message, and may therefore refrain from performing a retransmission.

Comparatively, upon receiving at least one NACK message, the Tx UE 115 may identify that at least one Rx UE 115 has requested retransmission, and may therefore trigger a retransmission of the sidelink message/sidelink data. Upon receiving a NACK message in response to a sidelink groupcast option 1 message, the Tx UE 115 may be configured to re-transmit an identical sidelink message using the same communications parameters (e.g., same MCS, same quantity of occupied subchannels) as the original sidelink message. In particular, some wireless communications systems do not provide for any flexibility in changing communications parameters for retransmissions of a given sidelink transport block (e.g., no flexibility for changing MCS and/or number of occupied subchannels), or flexibility for changing/adapting resources for retransmissions. Decreasing an MCS for retransmissions may increase a number of subchannels which are occupied by a retransmission. As such, by requiring retransmissions be performed using the same MCS as the original sidelink communication, some wireless communications systems may ensure that retransmissions occupy the same quantity of subchannels as the corresponding original transmissions.

The use of NACK-only feedback, and performance of identical sidelink retransmissions, may be sufficient in some cases, and may reduce the likelihood that Rx UEs 115 will experience decoding failures due to collisions with other sidelink messages. In particular, for reasonable NACK distances, a sidelink message will be decoded by Rx UEs 115 with a relatively high probability if the sidelink message is received without collision within the NACK distance. Additionally, when a sidelink message/transmission experiences a collision at an Rx UE 115, the chances that all the following retransmissions will also experience a collision is very small. In other words, there is a high probability that Rx UEs 115 which request retransmission of the sidelink message will eventually receive (and decode) a collision-free retransmission of the sidelink message. As such, this NACK-only type feedback may provide an efficient means to mitigate collisions (e.g., collisions with other sidelink messages).

However, there are cases where even collision-free sidelink messages may not be successfully decoded at Rx UEs 115. In particular, performing identical sidelink retransmissions may not improve a likelihood that subsequent sidelink messages (retransmissions) will be successfully decoded at the Rx UEs 115 when there are poor channel conditions (e.g., poor link quality) between the Tx UE 115 and the Rx UE 115. For example, channel fading and blockage may render receive power at the Rx UEs 115 low, even in cases where Rx UEs 115 are relatively close to the Tx UE 115. Additionally, sidelink communications within unlicensed spectrum bands may result in an Rx UE 115 attempting to decode received sidelink messages while locally experiencing persisting interference from a non-sidelink transmission (e.g., Wi-Fi signals). In such cases, NACK-only feedback which simply requests retransmission of an identical sidelink message is unlikely to result in successful decoding at the Rx UEs 115. In other words, if there are poor channel conditions, Rx UEs 115 may still be unable to decode sidelink retransmissions (even in the absence of collisions) if channel fading, blockage, and/or other non-sidelink interference persists. Without any knowledge of the channel between the Tx UE 115 and the Rx UEs 115, the Tx UE 115 may transmit an identical sidelink message (e.g., same MCS, same number of occupied subchannels) which is likely to suffer from the same poor channel conditions which necessitated the retransmission.

Accordingly, the UEs 115-*a*, 115-*b* and base station 105-*a* of the wireless communications system 200 may support techniques for enhanced feedback mechanisms in the context of sidelink groupcast communications (e.g., sidelink groupcast option 1 communications). In particular, techniques described herein enable the second UE 115-*b* (e.g., Rx UE 115-*b*) to transmit enhanced feedback messages in response to sidelink groupcast messages, where the enhanced feedback messages include both (1) a NACK, and (2) an indication of CSI for a channel (e.g., communication link 210) between the first UE 115-*a* and the second UE 115-*b*. In other words, techniques described herein may enable enhanced feedback messages which jointly encode a NACK indication as well as a CSI report. In particular, techniques described herein enable enhanced feedback messages which include a feedback sequence, where the feedback sequence jointly indicates a NACK and CSI (e.g., NACK+CSI sequence), or where the feedback sequence is a superposition of a NACK sequence and a CSI sequence).

By providing for enhanced feedback signaling which includes CSI reporting, the first UE 115-*a* may be able to selectively modify communication parameters (e.g., MCS) and/or resources used to perform retransmissions in order to improve the likelihood that retransmissions will be successfully decoded by the second UE 115-*b*. In other words, CSI reporting within enhanced feedback messages may enable the Tx UE 115-*a* to perform link adaptation which may improve the probability that sidelink messages (e.g., sidelink transport blocks) will be successfully decoded at the Rx UE 115-*b*.

For example, as shown in FIG. 2, the base station 105-*a* may transmit control signaling 215 to the first UE 115-*a*, the second UE 115-*b*, or both. In some aspects, the control signaling 215 may indicate a set of feedback sequences for feedback messages 240 associated with sidelink communications between the respective UEs 115-*a*, 115-*b*. In other words, the base station 105-*a* may configure the UEs 115-*a*, 115-*b* with a codebook of feedback sequences (e.g., codebook of "codewords") which may be used for enhanced feedback messages 240 between the respective UEs 115-*a*, 115-*b*. In some cases, each feedback sequence within the codebook of feedback sequences may jointly indicate a NACK and CSI. In this regard, the codebook of feedback sequences may include a codebook of "NACK+CSI sequences."

Additionally, or alternatively, each feedback sequence may include a superposition of a NACK sequence and a CSI sequence. In such cases, the codebook of feedback sequences may include a NACK sequence (e.g., legacy NACK sequence) and a set of CSI sequences. In such cases, each CSI sequence (e.g., each CSI codeword) within the codebook of CSI sequences may exhibit the same size/ length (e.g., same quantity of resource elements). Moreover, each CSI sequence may exhibit the same size/length as the legacy NACK sequence. Specifically, the size of the NACK sequence and each CSI sequence may match the number of physical resource blocks (e.g., resource elements) allocated for the PSFCH of any physical sidelink shared channel (PSSCH) transmission, which may be pre-configured by the network.

In some aspects, the control signaling 215 may include RRC signaling, MAC-CE signaling, and the like. In some aspects, each CSI sequence indicated via the control signaling 215 may be orthogonal to the NACK sequence (e.g., orthogonal to the legacy NACK sequence). In other words, the NACK sequence may be orthogonal to each CSI sequence of the codebook/set of CSI sequences in order to facilitate quick and efficient identification of the NACK sequence within enhanced feedback messages 240 and enable backwards-compatibility. The use of CSI sequences which are orthogonal to the NACK sequence, but non-orthogonal to one another, may prevent the need to change the conventions use of sidelink communications resources, both in terms of quantity and how resources are mapped to sidelink transmissions. However, in some implementations, the codebook of CSI sequences may include CSI sequences which are mutually orthogonal to one another, as well as orthogonal to the NACK sequence. The use of a codebook of CSI sequences which are mutually orthogonal and orthogonal to the legacy NACK sequence may require larger quantities of resources, and may therefore be utilized in cases with a sufficiently small codebook of CSI sequences.

In the context of feedback sequences which jointly indicate a NACK and CSI (e.g., joint NACK+CSI sequences), each respective feedback sequence may correspond to a respective CSI report from a set of potential CSI reports for the channel between the respective UEs 115-*a*, 115-*b*. For example, a first feedback sequence may be associated with a NACK and a first CSI report, and a second feedback sequence may be associated with a NACK and a second CSI report. In such cases, each feedback sequence within the codebook of feedback sequences may exhibit the same length as the legacy NACK sequence.

Similarly, in the context of feedback sequences which include a superposition of a NACK sequence and a CSI sequence, each CSI sequence may correspond to a respective CSI report from a set of potential CSI reports for the channel between the respective UEs 115-*a*, 115-*b*. For example, a first CSI sequence may be associated with a first CSI report, and a second CSI sequence may be associated with a second CSI report. By way of another example, each CSI sequence may correspond to a different CSI value from a set of CSI values specified in an MCS table. In other words, the control signaling 215 may indicate a table or other data object which indicates configures each CSI sequence with a corresponding CSI report, such that each CSI sequence may be used within enhanced feedback messages 240 to indicate the corresponding CSI.

In some aspects, the codebook-based feedback mechanisms described herein (e.g., feedback techniques using a codebook of feedback sequences and/or codebook of CSI sequences) may be implemented in such a manner as to allow reduced-capability UEs 115 (e.g., legacy UEs 115, Release 16/17 UEs 115) to perform legacy NACK detection. In particular, the codebook-based feedback mechanisms may enable legacy Tx UEs 115 to detect received NACK messages non-coherently (e.g., by measuring PSFCH signal energy), or coherently (e.g., by corelating received PSFCH signals with the legacy NACK sequence). In this regard, the enhanced feedback techniques described herein may facilitate backwards-compatibility with reduced-capability UEs 115, as will be described in further detail herein.

Continuing with reference to FIG. 2, the first UE 115-*a* may transmit a first sidelink message 220-*a* (e.g., PSSCH message) to the second UE 115-*b* via a sidelink channel between the respective UEs 115-*a*, 115-*a*. For example, as shown in FIG. 2, the first UE 115-*a* may utilize a subset of sidelink resources within a set of sidelink resources of the communications channel 210 to transmit a first sidelink message 220-*a*. In some aspects, the first sidelink message 220-*a* may include data (e.g., sidelink data) and a reservation for a retransmission resource 225 of the sidelink channel for retransmission of the first sidelink message 220-*a*. In other words, the first sidelink message 220-*a* may reserve retransmission resources 225 of the sidelink channel which may be used to retransmit the first sidelink message 220-*a*.

In some implementations, the first UE 115-*a* may transmit the first sidelink message 220-*a* using a first set of communication parameters. The first set of communication parameters may include, but are not limited to, a first MCS, a first redundancy version, and the like. In some aspects, the first sidelink message 220-*a* may include a sidelink groupcast message which is transmitted to a set of UEs 115 including the second UE 115-*b*. The first UE 115-*a* may transmit the first sidelink message 220-*a* based on receiving the control signaling 215 from the base station 105-*a*.

The first UE 115-*a* may transmit capability signaling to the second UE 115-*b*, where the capability signaling indicates a capability of the first UE 115-*a* to receive enhanced feedback messages 240. In other words, the UE 115-*a* may transmit an indication of a capability of the first UE 115-*a* to receive and recognize feedback messages 240 which include both feedback and CSI (e.g., feedback messages 240 including feedback sequences which jointly indicate a NACK and CSI, or feedback sequences which include a superposition of a NACK sequence and a CSI sequence).

In some aspects, the indication of the capability (e.g., capability signaling) of the first UE 115-*a* to receive and recognize enhanced feedback messages 240 may be transmitted via the first sidelink message 220-*a*, a sidelink control information (SCI) message, a MAC-CE message, or any combination thereof. For example, in some cases, the indication of the capability (e.g., capability signaling) may be indicated via an SCI portion of the first sidelink message 220-*a*. By way of another example, in other cases, the capability signaling may be transmitted via a MAC-CE message (e.g., MAC-CE message included within the first sidelink message 220-*a*.

As will be described in further detail herein, the form and content of feedback messages which will be transmitted by Rx UEs 115 (e.g., second UE 115-*b*) may depend on whether the first UE 115-*a* supports enhanced feedback techniques. In particular, if an Rx UE 115 determines a NACK based on a sidelink message 220 transmitted by a Tx UE 115 which supports enhanced feedback techniques, the Rx UE 115 may be configured to transmit only a legacy NACK sequence (e.g., if the Rx UE 115 is itself a reduced-capability or legacy UE 115), or may transmit an enhanced feedback message including a NACK and CSI observed by the Rx UE 115. In particular, the Rx UE 115 may transmit an enhanced feedback message including a feedback sequence which jointly indicates a NACK and CSI, or a feedback sequence which includes a superposition of a legacy NACK sequence and a CSI sequence indicating the CSI observed at the Rx UE 115 (e.g., Rx UE 115 superimposes a NACK sequence with a CSI sequence). Comparatively, if an Rx UE 115 determines a NACK based on a sidelink message 220 transmitted by a Tx UE 115 which does not support enhanced feedback techniques, the Rx UE 115 may be configured to transmit legacy NACK-only feedback.

In some aspects, the first UE 115-*a*, the second UE 115-*b*, or both, may identify a resource for reception/transmission of a feedback message 240 responsive to the first sidelink message 220-*a*. In other words, the first UE 115-*a* may determine which PSFCH 230 resource to monitor for a feedback message 240, and the second UE 115-*b* may determine which resource will be used for transmitting the feedback message 240. The UEs 115-*a*, 115-*b* may identify the resource for the feedback message 240 based on receiving the control signaling 215, transmitting/receiving the first sidelink message 220-*a*, transmitting/receiving the capability signaling, or any combination thereof.

For example, in some cases, the control signaling 215 and/or the first sidelink message 220-*a* may explicitly indicate a set of resources which will be used for the feedback message 240 responsive to the first sidelink message 220-*a*. For instance, the first sidelink message 220-*a* may include time domain resource allocation (TDRA) and/or frequency domain resource allocation (FDRA) fields which indicate the set of resources which are to be used for the feedback message 240 responsive to the first sidelink message 220-*a*. Additionally, or alternatively, the UEs 115-*a*, 115-*b* may identify the resources for the feedback message 240 based on a pre-configured relationship between the resources used to transmit/receive the first sidelink message 220-*a* and the resources used to transmit/receive the feedback message 240. In other words, the resources used for transmitting/receiving the feedback message 240 may be based on the resources used for transmitting/receiving the first sidelink message 220-*a*.

In some aspects, the first UE 115-*a* may receive a feedback message 240 (e.g., enhanced feedback message 240) from the second UE 115-*b*. The feedback message 240 may be transmitted via a PSFCH 230 associated with the sidelink channel between the respective UEs 115-*a*, 115-*b*. In particular, the first UE 115-*a* may receive the feedback message 240 based on (e.g., in response to) the first sidelink message 220-*a*. Moreover, the first UE 115-*a* and the second UE 115-*b* may transmit/receive the feedback message 240 based on transmitting/receiving the control signaling 215, transmitting/receiving the first sidelink message 220-*a*, transmitting/receiving the capability signaling, identifying the resource(s) for the feedback message 240, or any combination thereof.

For example, the second UE 115-*b* may transmit the feedback message 240 within the identified PSFCH 230 resource(s) and based on receiving the indication that the first UE 115-*a* is capable of receiving enhanced feedback messages 240. As noted previously herein, in the context of sidelink groupcast messages, all Rx UEs 115 including the second UE 115-*b* may transmit feedback messages 240 within the same, pre-configured PSFCH 230 resources. As such, the first UE 115-*a* will effectively receive a superposition of feedback messages 240 and NACK/CSI sequences.

In some aspects, the feedback message 240 may include an enhanced feedback message 240 which indicates both a NACK for the first sidelink message 220-*a*, and CSI associated with the sidelink channel between the respective UEs 115-*a*, 115-*b* (e.g., CSI observed at the second UE 115-*b*). In particular, the feedback message 240 may include a feedback sequence which indicates both the NACK and CSI. In such cases, the feedback sequence may jointly indicate the NACK and the CSI (e.g., joint NACK+CSI sequence). For example, the feedback message may include a feedback sequence selected from a codebook of feedback sequences, where each feedback sequence indicates both a NACK and indicates the CSI observed by the second UE 115-*b*.

In other cases, the feedback sequence may include a superposition of a NACK sequence and a CSI sequence (e.g., feedback sequence=NACK sequence+CSI sequence). For example, in some cases, the feedback message 240 may include a NACK sequence which indicates that the second UE 115-*b* did not successfully receive and/or decode the first sidelink message 220-*a*. Additionally, continuing with the same example, the feedback message 240 may include a CSI sequence selected from a codebook of CSI sequences, where the selected CSI sequence indicates the CSI observed by the UE 115-*b*. In particular, the CSI sequence within the feedback message 240 may be included within the set of CSI sequences (e.g., codebook of CSI sequences) configured/indicated via the control signaling 215, where the CSI sequence is associated with a CSI report for the sidelink channel between the respective UEs 115-*a*, 115-*b*. In this regard, the second UE 115-*b* may determine CSI (e.g., CQI, RSSI, RSRP, RSRQ, noise, interference, etc.) associated with the sidelink channel between the respective UEs 115-*a*, 115-*b* based on the first sidelink message 220-*a* and/or other sidelink communications, and may select a CSI sequence from a set of pre-configured CSI sequences which represents the determined CSI. Accordingly, the CSI sequence included within the feedback message 240 may indicate a CSI report and/or other channel information associated with the sidelink channel between the first UE 115-*a* and the second UE 115-*b*.

In some aspects, each CSI sequence within a codebook of CSI sequences may be orthogonal to the NACK sequence to facilitate improved decoding and identification of the respective sequences by the first UE 115-*a*. In such cases, the feedback message 240 may include a superposition of the NACK sequence and the CSI sequence. In this regard, the feedback message 240 may include a pair of feedback sequences including a NACK sequence and a CSI sequence. In some aspects, the codebook of N feedback sequences may be represented by $\{x_1, x_2, \ldots, x_N\}$, where $x_0$ denotes the legacy NACK sequence, and $\{x_1, x_2, \ldots, x_N\}$ denote CSI sequences. In such cases, an Rx UE 115 (e.g., second UE 115-*b*) that needs to transmit enhanced feedback information may transmit a superposition of (1) the legacy NACK sequence $x_0$ and (2) a CSI sequence $x_i$ from the codebook of CSI sequences $\{x_1, x_2, \ldots, x_N\}$. For example, the feedback message 240 may include $\alpha x_0+\beta x_i$, where $\alpha$ and $\beta$ are scalars defining how the transmit power of the feedback message 240 is divided between the respective sequences. In some aspects, the power allocation between the NACK sequence and the CSI sequence (e.g., ratio of $\alpha$ and $\beta$) may be pre-configured, signaled by the base station 105-*a*, selected by the Rx UE 115-*b* or Tx UE 115-*a*, or any combination thereof.

Each CSI sequence within the enhanced feedback codebook of CSI sequences (e.g., $\{x_1, x_2, \ldots, x_N\}$) may be orthogonal to the legacy NACK sequence $x_0$, even in cases where each of the respective CSI sequences are not mutually orthogonal with respect to one another. Maintaining orthogonality between the CSI sequences and the legacy NACK sequence may assist legacy Tx UEs 115 to coherently detect the presence of the NACK sequence $x_0$, as the presence of the superimposed orthogonal CSI sequence $x_i$ may not introduce interference which hinders coherent NACK detection. Moreover, advanced Tx UEs 115 which are able to receive/detect enhanced feedback messages 240 may attempt to identify both sequences within the feedback message 240 (e.g., identify both $x_0$ and $x_i$). For example, in cases where the first UE 115-*a* is an advanced UE 115 capable of receiving enhanced feedback messages 240, the first UE 115-*a* may detect the presence of the NACK sequence $x_0$, and subtract (e.g., cancel out) the NACK sequence x, from the received signal prior to detecting the CSI sequence $x_i$. Additionally, or alternatively, the first UE 115-*a* may jointly detect both the NACK sequence $x_0$ and the CSI sequence $x_i$. Whether the first UE 115-*a* performs sequential or joint sequence detection may be left up to UE 115 implementation.

As noted previously herein, upon detecting a feedback sequence (e.g., joint NACK+CSI sequence within feedback message 240, or superposition of NACK sequence and CSI sequence within feedback message 240) within the PSFCH 230, the first UE 115-*a* may be configured to identify that at least one Rx UE 115 did not successfully decode the first sidelink message 220-*a* (e.g., transport block of the first sidelink message 220-*a*). Moreover, in cases where the feedback message 240 includes CSI, the first UE 115-*a* may be configured to determine that the first UE 115-*a* is to perform a retransmission which should be adapted to the indicated CSI within the feedback message 240. In some aspects, the Tx UE 115-*a* may perform conventional maximum likelihood detection of the sequences within the feedback message 240.

In some aspects, the Tx UE 115-*a* may perform compressive-sensing techniques for detecting NACK sequences and/or CSI sequences within feedback messages 240. For example, upon transmitting the first sidelink message 220-*a* (e.g., sidelink groupcast message), the first UE 115-*a* may receive only a few feedback messages 240 from a few Rx UEs 115. In such cases, the PSFCH 230 signal received by the first UE 115-*a* may include the superposition of the same limited number of feedback sequences (e.g., NACK sequence, and CSI sequences). If the number of feedback sequences received within the PSFCH 230 signal is greater than some threshold (e.g., greater than four), the detection of the feedback sequences may be performed as a compressive sensing problem which allows for efficient algorithms.

The codebook-based feedback mechanisms may enable legacy Tx UEs 115 to detect received NACK messages non-coherently (e.g., by measuring PSFCH signal energy), coherently (e.g., by corelating received PSFCH signals with the legacy NACK sequence). In this regard, the enhanced feedback techniques described herein may facilitate backwards-compatibility with reduced-capability UEs 115. Indeed, according to the enhanced feedback techniques described herein, legacy Tx UEs 115 should be able to detect a legacy NACK-only sequence even when a retransmission is requested by an Rx UE 115 using an enhanced feedback message 240 (e.g., feedback message 240 including CSI), regardless as to whether the legacy Tx UE 115 performs coherent or non-coherent NACK detection.

For example, in some cases, the first UE 115-*a* may include a reduced-capability UE 115-*a* (e.g., legacy UE 115-*a*) which does not support enhanced feedback mechanisms described herein. In such cases, the first UE 115-*a* may detect the presence of the NACK sequence within the feedback message non-coherently by measuring PSFCH signal energy, and comparing the measured energy to a threshold. In such cases, the use of a different NACK sequence within the feedback message and/or the inclusion of CSI sequences may have no impact on the ability of the legacy first UE 115-*a* to identify a NACK, assuming that the NACK sequence and/or CSI sequence within the feedback message 240 are transmitted with the same or similar power as legacy NACK sequences.

For instance, the first UE 115-*a* may identify a transmit power associated with the feedback sequence that indicates the NACK (e.g., NACK sequence) within the feedback message 240. In particular, the first UE 115-*a* may identify the transmit power associated with the feedback sequence, and compare the identified transmit power to a threshold transmit power to determine whether or not the first UE 115-*a* should retransmit the first sidelink message 220-*a* (e.g., retransmit the data within the first sidelink message 220-*a*). For example, the first UE 115-*a* may be configured to retransmit the first sidelink message 220-*a* if the identified transmit power $P_{Tx}$ satisfies the threshold transmit power $P_{Thresh\text{-}Tx}$ (e.g., trigger retransmission if $P_{Tx} \geq P_{Thresh\text{-}Tx}$). Comparatively, the first UE 115-*a* may be configured to refrain from retransmitting the first sidelink message 220-*a* if the identified transmit power $P_{Tx}$ fails to satisfy the threshold transmit power $P_{Thresh\text{-}Tx}$ (e.g., refrain from retransmitting if $P_{Tx} < P_{Thresh\text{-}Tx}$).

Additionally, or alternatively, legacy UEs 115 may be able to perform NACK detection coherently. For example, in some cases, the first UE 115-*a* may include a reduced-capability UE 115-*a* (e.g., legacy UE 115-*a*) which does not support enhanced feedback mechanisms described herein. In such cases, the first UE 115-*a* may detect the presence of a feedback sequence within the feedback message 240 (and/or a NACK sequence superimposed with a CSI sequence) coherently by correlating the received PSFCH 230 signal (e.g., correlating the received feedback message 240) with the NACK sequence in order to coherently identify the NACK sequence. However, it is noted herein that legacy UEs 115 may not be able to realize the presence of a PSFCH sequence if the NACK sequence included within the feedback message 240 is not the same as the legacy NACK-only sequence, which may result in performance degradation.

Subsequently, the first UE 115-*a* may transmit a second sidelink message 220-*b* to the second UE 115-*b*, where the second sidelink message 220-*b* includes the data of the first sidelink message 220-*a*. In this regard, the second sidelink message 220-*b* may include a retransmission of the data included within the first sidelink message 220-*a*. In some aspects, the second sidelink message 220-*b* may include a sidelink groupcast message which is transmitted to a set of UEs 115 including the second UE 115-*b*. The first UE 115-*a* may transmit the second sidelink message 220-*b* based on receiving the control signaling 215, transmitting the first sidelink message 220-*a*, transmitting the capability signaling, identifying the resource(s) for the feedback message 240, receiving the feedback message 240, identifying the transmit power of the feedback message 240, or any combination thereof. For example, the first UE 115-*a* may transmit the second sidelink message 220-*b* based on receiving the feedback sequence indicating the NACK and CSI within the feedback message 240 (e.g., feedback sequence which jointly indicates a NACK and CSI, or feedback sequence which includes a superposition of a NACK sequence and a CSI sequence). Moreover, the first UE 115-*a* may transmit the second sidelink message 220-*b* (e.g., perform the retransmission) based on the identified transmit power of the feedback sequence and/or NACK sequence within the feedback message 240 satisfying the threshold transmit power.

In particular, upon receiving the feedback message 240 including a feedback sequence indicating a NACK and CSI, the first UE 115-*a* may be configured to adjust communications parameters and/or sidelink resources used to transmit the second sidelink message 220-*b*. In other words, the first UE 115-*a* may be configured to perform link adaptation to improve the probability that the second sidelink message 220-*b* (e.g., retransmission of the first sidelink message 220-*a*) will be successfully received and decoded by Rx UEs 115, including the second UE 115-*b*.

Accordingly, in some aspects, the first UE 115-*a* may transmit the second sidelink message 220-*b* using a different set of communication parameters (e.g., different MCS) compared to the first sidelink message 220-*a* and/or via a different set of resources than the resources which were reserved for retransmissions of the first sidelink message 220-*a*. In this regard, the first UE 115-*a* may transmit the second sidelink message 220-*b* using a second set of communication parameters which is different from the first set of communication parameters used to transmit the first sidelink message 220-*a*. The second set of communication parameters may include, but are not limited to, a second MCS, a second redundancy version, and the like.

For example, the first UE 115-*a* may transmit the second sidelink message 220-*b* using a second MCS which is different from (e.g., smaller than) the first MCS used to transmit the first sidelink message 220-*a*. For instance, in cases where the CSI (e.g., CSI sequence, joint NACK+CSI sequence) indicated within the feedback message 240 indicates poor channel conditions for the sidelink channel between the respective UEs 115-*a*, 115-*b*, the first UE 115-*b* may transmit the second sidelink message 220-*b* using a smaller MCS (e.g., increased redundancy) to improve the probability that the second sidelink message 220-*b* will be successfully received and decoded at the second UE 115-*b*.

In some cases, the first UE 115-*a* may select the smallest MCS possible which still enables the second sidelink message 220-*b* to be transmitted within the retransmission resource 225 which was previously reserved via the first sidelink message 220-*a*. Additionally, the first UE 115-*a* may select the second MCS for the second sidelink message 220-*b* based on the CSI (e.g., CSI sequence, joint NACK+CSI sequence) included within the feedback message 240.

In the context of feedback sequences which jointly indicate a NACK and CSI, each feedback sequence may correspond to a respective CSI report and/or respective MCS which is to be used for retransmissions. Similarly, in the context of feedback sequences which include a superposition of a NACK sequence and a CSI sequence, each CSI sequence may correspond to a respective CSI report and/or respective MCS which is to be used for retransmissions. In this regard, different pre-configured feedback sequences (e.g., joint NACK+CSI sequences) and/or configured CSI sequences may be used to indicate respective pre-configured MCSs which are to be used for retransmissions of sidelink messages. As such, the first UE 115-*a* may identify the second MCS which is to be used for transmission of the second sidelink message 220-*b* from a set of candidate MCSs based on the CSI (e.g., CSI sequence, joint NACK+CSI sequence) included within the feedback message 240. In cases where the first UE 115-*a* receives multiple enhanced feedback messages 240 from multiple Rx UEs 115, the first UE 115-*a* may determine the MCS which will be used for the retransmission/second sidelink message 220-*b* based on the worst received CSI report (e.g., worst indicated CSI).

Additionally, or alternatively, the first UE 115-*a* may transmit the second sidelink message 220-*b* within the retransmission resource 225 which was reserved via the first sidelink message 220-*a*, via a second resource which is different from the retransmission resource 225, or both. In this regard, the second sidelink message 220-*b* may be transmitted/received within the previously-reserved retransmission resource 225, and/or via a different resource. In this regard, in some cases, the first UE 115-*a* may transmit the second sidelink message 220-*b* over a greater quantity of subchannels than the previously-reserved retransmission resource 225, and/or over a greater quantity of subchannels than were used for the first sidelink message 220-*a* for the same transport block. Resources which are used for the second sidelink message 220-*b* will be described in further detail with respect to FIG. 3.

Techniques described herein may enable the use of enhanced feedback signaling mechanisms for sidelink communications. In particular, by enabling the second UE 115-*b* (e.g., Rx UE 115) to include CSI within feedback messages 240 transmitted in response to sidelink groupcast messages, techniques described herein may facilitate improved channel knowledge at the first UE 115-*a* (e.g., Tx UE 115), thereby enabling the first UE 115-*a* to adjust parameters (e.g., MCS) and/or resources used for sidelink retransmissions to improve a probability that retransmissions will be successfully received and decoded at the second UE 115-*b*. As such, techniques described herein may lead to more effective and reliable sidelink communications, as well as improved utilization of sidelink resources.

FIG. 3 illustrates an example of a resource configuration 300 that supports techniques for enhanced feedback and link adaptation for sidelink groupcast communications in accordance with aspects of the present disclosure. In some examples, resource configuration 300 may implement, or be implemented by, aspects of wireless communications system 100, wireless communications system 200, or both.

As noted previously herein, in some conventional systems for sidelink feedback, retransmissions of sidelink messages (e.g., retransmissions of sidelink groupcast messages) may be expected to occupy the same quantity of subchannels, and use the same communications parameters (e.g., MCS), as the original sidelink message. For example, referring to the first resource allocation scheme 305-*a*, a Tx UE 115 may transmit a first sidelink message 310, where the first sidelink message 310 reserves a retransmission resource 315 for retransmissions of the first sidelink message 310. According to some conventional feedback techniques, the reserved retransmission resource 315 may be expected to occupy the same quantity of subchannels as the number of subchannels occupied by the first sidelink message 310 that reserved the retransmission resource 315. Moreover, according to some conventional feedback techniques, any retransmissions performed within the retransmission resource 315 may be expected to be an exact copy of the first sidelink message 310 (e.g., same MCS).

Comparatively, techniques described herein may provide for enhanced feedback messages 320, which may enable Tx UEs 115 to perform link adaptation to adjust communications parameters and/or resources which are used to perform retransmissions of sidelink messages.

For example, referring to the second resource allocation scheme 305-*b*, a Tx UE 115 may transmit a first sidelink message 310, where the sidelink message includes data and reserves a retransmission resource 315 for retransmissions of the first sidelink message 310. The first sidelink message 310 may include a PSSCH message, a sidelink groupcast message (e.g., sidelink groupcast option 1 message), or both. In this example, the Tx UE 115 may receive one or more enhanced feedback messages 320 within a PSFCH 325 from one or more Rx UEs 115. The enhanced feedback message 320 may include a feedback sequence that indicates a NACK and CSI associated with a sidelink channel between the Tx UE 115 and the respective Rx UE 115 (e.g., CSI observed at the respective Rx UE 115). In particular, the feedback sequence within the feedback message 320 may jointly indicate a NACK and observed CSI (e.g., joint NACK+CSI sequence). For example, as noted previously herein, the feedback message 320 may include a feedback sequence selected from a codebook of joint NACK+CSI sequences, where the feedback sequence corresponds to a respective CSI report for the sidelink channel between the Tx UE 115 and the Rx UE 115.

Additionally, or alternatively, the feedback sequence within the feedback message 320 may include a superposition of a NACK sequence and a CSI sequence. For example, as noted previously herein, the feedback message 320 may include a NACK sequence and a CSI sequence selected from a codebook of CSI sequences, where the CSI sequence corresponds to a respective CSI report for the sidelink channel between the Tx UE 115 and the Rx UE 115.

In some cases, with the enhanced feedback techniques described herein, a Tx UE 115 may find itself in a position where it has received an indication to retransmit a sidelink message 310 using a smaller MCS, and therefore a larger quantity of subchannels than the quantity of subchannels that have already been reserved. For example, continuing with reference to the second resource allocation scheme 305-*b*, the feedback message 320 may include CSI which corresponds to a smaller MCS, which would require a retransmission to occupy three subchannels, as opposed to the two subchannels of the previously-reserved retransmission resource 315. In such cases, the Tx UE 115 could reduce the MCS for a second sidelink message (e.g., retransmission of the first sidelink message 310) so that the second sidelink message still results in a retransmission which is contained within the previously-reserved retransmission resource 315. In other words, the Tx UE 115 could reduce the MCS to the smallest possible value which still results in the retransmission of the first sidelink message 310 being transmitted within the two subchannels of the retransmission resource 315.

Additionally, or alternatively, the Tx UE 115 could utilize adjacent subchannels of the retransmission resource 315 to accommodate the increased resource requirements of the sidelink retransmission. For example, as shown in FIG. 3, the Tx UE 115 may transmit a second sidelink message via the retransmission resource 315 and via an additional resource 335-*a* which is adjacent to a boundary of the retransmission resource 315 in the frequency domain. In such cases, the "extension" of the retransmission resource 315 (i.e., the use of the additional resource 335-*a* for the retransmission) may not be announced. In other words, the Tx UE 115 may not formally reserve the additional resource 335-*a* via control signaling. Moreover, in some cases, the Tx UE 115 may utilize sidelink resources which are adjacent to the retransmission resource 315 only in cases where the adjacent sidelink resources have not been previously reserved by other UEs 115.

For example, as shown in the resource allocation scheme 305-*b*, other UEs 115 may have previously reserved sidelink resources at the time of the retransmission, as illustrated by reserved resources 330. In this example, the additional resource 335-*a* may not have been previously reserved by another UE 115, which enables the Tx UE 115 to utilize the additional resource 335-*a* for transmitting the retransmission of the first sidelink message 310. In other words, the Tx UE 115 may be required to monitor for reservations of sidelink resources, and track whether subchannels which are adjacent to the retransmission resource 315 are available up until the time that the Tx UE 115 performs the retransmission.

In cases where adjacent subchannels have not been previously reserved by another UE 115, the Tx UE 115 may perform the retransmission within the retransmission resource 315 and the additional resource 335-*a* which is adjacent to the retransmission resource in the frequency domain, as illustrated in the second resource allocation scheme 305-*b*. Comparatively, in cases where resources which are adjacent to the retransmission resource 315 have been previously reserved by other UEs 115, the Tx UE 115 may select new resources for the retransmission, as illustrated in the third resource allocation scheme 305-*c*.

Referring to the third resource allocation scheme 305-*c*, a Tx UE 115 may transmit a first sidelink message 310, where the first sidelink message 310 includes data and reserves a retransmission resource 315 for retransmissions of the first sidelink message 310. In this example, the Tx UE 115 may receive a feedback message 320 within a PSFCH 325, where the enhanced feedback message 320 indicates a NACK and CSI associated with a sidelink channel between the Tx UE 115 and the respective Rx UE 115 (e.g., CSI observed by the respective Rx UE 115). In particular, the feedback sequence within the feedback message 320 may jointly indicate a NACK and observed CSI (e.g., joint NACK+CSI sequence). Additionally, or alternatively, the feedback sequence within the feedback message 320 may include a superposition of a NACK sequence and a CSI sequence. The feedback sequence within the feedback message 320 may correspond to a CSI report which is associated with an MCS that will require retransmissions to occupy three subchannels. Additionally, or alternatively, the feedback message 320 may explicitly indicate that retransmissions are to occupy three subchannels.

In this example, the Tx UE 115 may continue to monitor for reservations of sidelink messages up until the time of the retransmission. In this example, the Tx UE 115 may identify a reserved resource 330 is positioned adjacent to the retransmission resource 315 in the frequency domain. In this regard, the Tx UE 115 may determine that it is unable to "extend" the retransmission resource 315 due to the presence of the reserved resource 330. In such cases, the Tx UE 115 may effectively abandon the originally reserved retransmission resource 315 and select a new additional resource 335-*b* for performing the retransmission. For instance, as shown in the third resource allocation scheme 305-*c*, the Tx UE 115 may select an additional resource 335-*b* for performing the retransmission (e.g., resource re-evaluation and re-selection), where the additional resource 335-*b* includes a different set of time and frequency resources as compared to the original retransmission resource 315. The Tx UE 115 may then transmit a second sidelink message (e.g., retransmission of the first sidelink message 310) via the additional resource 335-*b*. In this example, the selection of the and use of the additional resource 335-*b* for the retransmission may not be announced. In other words, the Tx UE 115 may not formally reserve the additional resource 335-*b* via control signaling.

Figure 4:
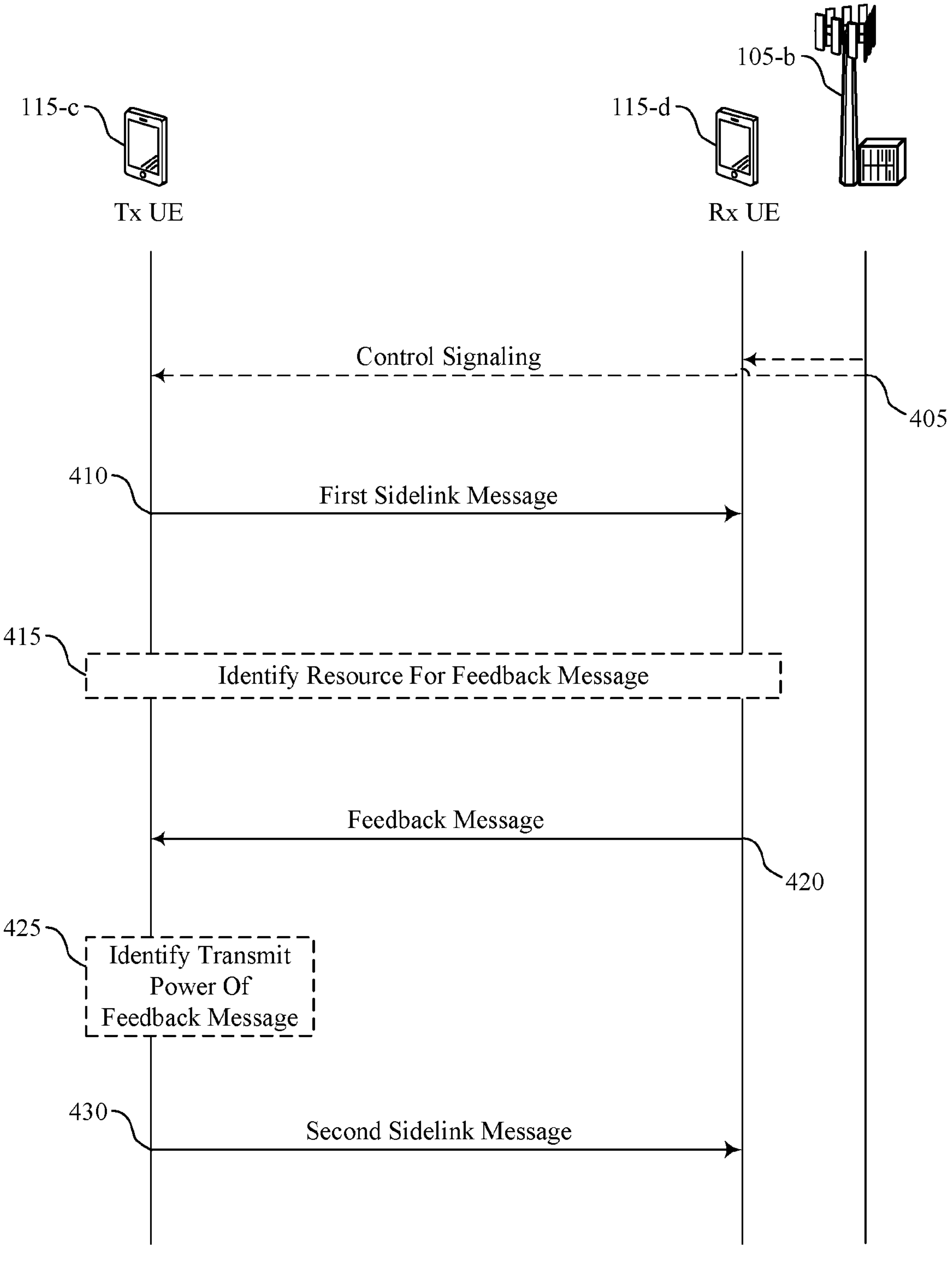
FIG. 4 illustrates an example of a process flow that supports techniques for enhanced feedback and link adaptation for sidelink groupcast communications in accordance with aspects of the present disclosure.

FIG. 4 illustrates an example of a process flow 400 that supports techniques for enhanced feedback and link adaptation for sidelink groupcast communications in accordance with aspects of the present disclosure. In some examples, process flow 400 may implement, or be implemented by, aspects of wireless communications system 100, wireless communications system 200, resource configuration 300, or any combination thereof. For example, the process flow 400 may illustrate a first UE 115-*c* transmitting a first sidelink message to a second UE 115-*d*, receiving an enhanced feedback message in response to the first sidelink message, and transmitting a second sidelink message based on information included within the enhanced feedback message, as described with reference to FIGS. 1-3.

In some cases, process flow 400 may include a first UE 115-*c*, a second UE 115-*d*, and a base station 105-*b*, which may be examples of corresponding devices as described herein. In particular, the first UE 115-*c* and the second UE 115-*d* illustrated in FIG. 4 may include examples of the first UE 115-*a* and the second UE 115-*b*, respectively, as illustrated in FIG. 2. Similarly, the base station 105-*b* illustrated in FIG. 4 may include an example of the base station 105-*a* illustrated in FIG. 2.

In some examples, the operations illustrated in process flow 400 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 405, the base station 105-*b* may transmit control signaling to the first UE 115-*c*, the second UE 115-*d*, or both. In some aspects, the control signaling may indicate a set of feedback sequences for feedback messages associated with sidelink communications between the respective UEs 115-*c*, 115-*d*. In other words, the base station 105-*b* may configure the UEs 115-*c*, 115-*d* with a codebook of feedback sequences which may be used for enhanced feedback messages between the respective UEs 115-*c*, 115-*d*. In some aspects, the control signaling may include RRC signaling, MAC-CE signaling, and the like.

In some cases, each feedback sequence within the codebook of feedback sequences may jointly indicate a NACK and CSI. In this regard, the codebook of feedback sequences may include a codebook of "NACK+CSI sequences." In such cases, each feedback sequence within the codebook of feedback sequences may correspond to a respective CSI report from a set of potential CSI reports for the channel between the respective UEs 115-*c*, 115-*d*. For example, a first feedback sequence may indicate a NACK and a first CSI report, and a second feedback sequence may indicate a NACK and a second CSI report.

Additionally, or alternatively, each feedback sequence may include a superposition of a NACK sequence and a CSI sequence. In such cases, the codebook of feedback sequences may include a NACK sequence (e.g., legacy NACK sequence) and a set of CSI sequences. In such cases, each CSI sequence indicated via the control signaling may be orthogonal to the NACK sequence. In other words, the NACK sequence may be orthogonal to the set of CSI sequences in order to facilitate quick and efficient identification of the NACK sequence within enhanced feedback messages. Moreover, in some cases, a first subset of the CSI sequences may be orthogonal to a second set of the CSI sequences. In some aspects, each CSI sequence may correspond to a respective CSI report from a set of potential CSI reports for the channel between the respective UEs 115-*c*, 115-*d*. For example, a first CSI sequence may be associated with a first CSI report, and a second CSI sequence may be associated with a second CSI report. In other words, the control signaling may indicate a table or other data object which indicates configures each CSI sequence with a corresponding CSI report, such that each CSI sequence may be used within enhanced feedback messages to indicate the corresponding CSI report.

At 410, the first UE 115-*c* may transmit a first sidelink message to the second UE 115-*d* via a sidelink channel between the respective UEs 115-*c*, 115-*c*. In some aspects, the first sidelink message may include data (e.g., sidelink data) and a reservation for a retransmission resource of the sidelink channel for retransmission of the first sidelink message. In other words, the first sidelink message may reserve retransmission resources of the sidelink channel which may be used to retransmit the first sidelink message. In some implementations, the first UE 115-*c* may transmit the first sidelink message using a first set of communication parameters. The first set of communication parameters may include, but are not limited to, a first MCS, a first redundancy version, and the like. In some aspects, the first sidelink message may include a sidelink groupcast message which is transmitted to a set of UEs 115 including the second UE 115-*b*. The first UE 115-*c* may transmit the first sidelink message at 410 based on receiving the control signaling at 405.

In some aspects, the first UE 115-*c* may transmit capability signaling to the second UE 115-*d*, where the capability signaling indicates a capability of the first UE 115-*c* to receive enhanced feedback messages. In other words, the UE 115-*c* may transmit an indication of a capability of the first UE 115-*c* to receive feedback messages which include both feedback and CSI (e.g., feedback messages including a feedback sequence which jointly indicates a NACK and CSI, or feedback messages including a feedback sequence which is a superposition of both a NACK sequence and a CSI sequence).

In some aspects, the indication of the capability of the first UE 115-*c* to receive enhanced feedback messages may be transmitted via the first sidelink message at 410, an SCI message, a MAC-CE message, or any combination thereof. For example, in some cases, the indication of the capability may be indicated via an SCI portion of the first sidelink message at 410. By way of another example, in other cases, the indication of the capability may be transmitted via a MAC-CE message (e.g., MAC-CE included within the first sidelink message at 410).

At 415, the first UE 115-*c*, the second UE 115-*d*, or both, may identify a resource for reception/transmission of a feedback message responsive to the first sidelink message. In other words, the first UE 115-*c* may determine which resource to monitor for a feedback message, and the second UE 115-*d* may determine which resource will be used for transmitting the feedback message.

The UEs 115-*c*, 115-*d* may identify the resource for the feedback message based on receiving the control signaling at 405, transmitting/receiving the first sidelink message at 410, transmitting/receiving the capability signaling (e.g., via the first sidelink message), or any combination thereof. For example, in some cases, the control signaling and/or the first sidelink message may explicitly indicate a set of resources which will be used for the feedback message responsive to the first sidelink message. For instance, the first sidelink message may include TDRA and/or FDRA fields which indicate the set of resources which are to be used for the feedback message responsive to the first sidelink message.

Additionally, or alternatively, the UEs 115-*c*, 115-*d* may identify the resources for the feedback message based on a pre-configured relationship between the resources used to transmit/receive the first sidelink message and the resources used to transmit/receive the feedback message. In other words, the resources used for transmitting/receiving the feedback message may be based on the resources used for transmitting/receiving the first sidelink message.

At 420, the first UE 115-*c* may receive a feedback message (e.g., enhanced feedback message) from the second UE 115-*d*. The feedback message may be transmitted via a PSFCH associated with the sidelink channel between the respective UEs 115-*c*, 115-*d*. In particular, the first UE 115-*c* may receive the feedback message at 420 based on (e.g., in response to) the first sidelink message at 410. Moreover, the first UE 115-*c* and the second UE 115-*d* may transmit/receive the feedback message at 420 based on transmitting/receiving the control signaling at 405, transmitting/receiving the first sidelink message at 410, transmitting/receiving the capability signaling (e.g., via the first sidelink message), identifying the resource(s) for the feedback message at 415, or any combination thereof. For example, the second UE 115-*d* may transmit the feedback message within the resource(s) identified at 415 and based on receiving the indication that the first UE 115-*c* is capable of receiving enhanced feedback messages.

In some aspects, the feedback message may include an enhanced feedback message which indicates a NACK for the first sidelink message and CSI associated with the sidelink channel between the respective UEs 115-*c*, 115-*d* (e.g., CSI observed at the second UE 115-*d*). In particular, the feedback message may include a feedback sequence which jointly indicates the NACK and the CSI, or a feedback sequence which is a superposition of a NACK sequence and a CSI sequence.

For example, in some cases, the feedback message may include a feedback sequence which jointly indicates (1) a NACK, and (2) CSI observed at the second UE 115-*d*. In this example, the feedback sequence within the feedback message may be included within the set of feedback sequences configured/indicated via the control signaling at 405. In this regard, the second UE 115-*d* may determine CSI (e.g., CSI, RSSI, RSRP, RSRQ, noise, interference, etc.) associated with the sidelink channel between the respective UEs 115-*c*, 115-*d* based on the first sidelink message and/or other sidelink communications, and may select a feedback sequence from a set of pre-configured feedback sequences which represents the determined CSI. Accordingly, the feedback sequence (e.g., joint NACK+CSI sequence) included within the feedback message may indicate a CSI report and/or other channel information associated with the sidelink channel between the first UE 115-*c* and the second UE 115-*d*.

By way of another example, in some cases, the feedback message may include a NACK sequence which indicates that the second UE 115-*d* did not successfully receive and/or decode the first sidelink message at 410. Additionally, continuing with the same example, the feedback message may include a CSI sequence which includes the CSI. In this regard, the feedback message may include a feedback sequence which is a superposition of (1) a NACK sequence, and (2) a CSI sequence. In this example, the CSI sequence within the feedback message may be included within the set of CSI sequences configured/indicated via the control signaling at 405, where the CSI sequence is associated with a CSI report for the sidelink channel between the respective UEs 115-*c*, 115-*d*. In this regard, the second UE 115-*d* may determine CSI (e.g., CSI, RSSI, RSRP, RSRQ, noise, interference, etc.) associated with the sidelink channel between the respective UEs 115-*c*, 115-*d* based on the first sidelink message and/or other sidelink communications, and may select a CSI sequence from a set of pre-configured CSI sequences which represents the determined CSI. Accordingly, the CSI sequence included within the feedback message may indicate a CSI report and/or other channel information associated with the sidelink channel between the first UE 115-*c* and the second UE 115-*d*. In such cases, the NACK sequence and the CSI sequence included within the feedback message may include separate sequences (e.g., feedback sequence=superposition of NACK sequence and CSI sequence). For example, as noted previously herein, the CSI sequence may be orthogonal to the NACK sequence to facilitate improved decoding and identification of the respective sequences by the first UE 115-*c*. In such cases, the feedback message may include a superposition of the NACK sequence and the CSI sequence.

At 425, the first UE 115-*c* may identify a transmit power associated with the feedback sequence within the feedback message that indicates the NACK and/or CSI. In particular, the first UE 115-*c* may identify the transmit power associated with the NACK sequence, and compare the identified transmit power to a threshold transmit power to determine whether or not the first UE 115-*c* should retransmit the first sidelink message (e.g., retransmit the data within the first sidelink message). For example, the first UE 115-*c* may be configured to retransmit the first sidelink message if the identified transmit power $P_{Tx}$ satisfies the threshold transmit power $P_{Thresh\text{-}Tx}$ (e.g., trigger retransmission if $P_{Tx} \geq P_{Thresh\text{-}Tx}$). Comparatively, the first UE 115-*c* may be configured to refrain from retransmitting the first sidelink message if the identified transmit power $P_{Tx}$ fails to satisfy the threshold transmit power $P_{Thresh\text{-}Tx}$ (e.g., refrain from retransmitting if $P_{Tx} < P_{Thresh\text{-}Tx}$).

At 430, the first UE 115-*c* may transmit a second sidelink message to the second UE 115-*d*, where the second sidelink message includes the data of the first sidelink message. In this regard, the second sidelink message may include a retransmission of the data included within the first sidelink message at 410. In some aspects, the second sidelink message may include a sidelink groupcast message which is transmitted to a set of UEs 115 including the second UE 115-*b*.

The first UE 115-*c* may transmit the second sidelink message at 430 based on receiving the control signaling at 405, transmitting the first sidelink message at 410, transmitting the capability signaling, identifying the resource(s) for the feedback message at 415, receiving the feedback message at 420, identifying the transmit power of the feedback message at 425, or any combination thereof. For example, the first UE 115-*c* may transmit the second sidelink message based on receiving the feedback sequence which jointly indicates the NACK and the CSI within the feedback message at 430. By way of another example, the first UE 115-*c* may transmit the second sidelink message based on receiving the NACK sequence and the CSI (e.g., CSI sequence) within the feedback message at 430 (e.g., superposition of NACK sequence and CSI sequence). Moreover, the first UE 115-*c* may transmit the second sidelink message (e.g., perform the retransmission) based on the identified transmit power of the NACK sequence within the feedback message satisfying the threshold transmit power.

In some aspects, the first UE 115-*c* may transmit the second sidelink message at 430 using a different set of communication parameters (e.g., different MCS) compared to the first sidelink message and/or via a different set of resources than the resources which were reserved for retransmissions of the first sidelink message. In this regard, the first UE 115-*c* may transmit the second sidelink message using a second set of communication parameters which is different from the first set of communication parameters used to transmit the first sidelink message. The second set of communication parameters may include, but are not limited to, a second MCS, a second redundancy version, and the like. For example, the first UE 115-*c* may transmit the second sidelink message using a second MCS which is different from (e.g., smaller than) the first MCS used to transmit the first sidelink message. For instance, in cases where the CSI (e.g., CSI sequence) within the feedback message indicates poor channel conditions for the sidelink channel between the respective UEs 115-*c*, 115-*d*, the first UE 115-*d* may transmit the second sidelink message using a smaller MCS (e.g., increased redundancy) to improve the probability that the second sidelink message will be successfully received and decoded at the second UE 115-*d*.

In some cases, the first UE 115-*c* may select the smallest MCS possible which still enables the second sidelink message to be transmitted within the retransmission resource which was previously reserved via the first sidelink message. Additionally, the first UE 115-*c* may select the second MCS for the second sidelink message based on the CSI (e.g., CSI sequence) included within the feedback message. In some cases, each CSI sequence may correspond to a respective CSI report and/or respective MCS which is to be used for retransmissions. In this regard, different pre-configured CSI sequences may be used to indicate respective pre-configured MCSs which are to be used for retransmissions of sidelink messages. As such, the first UE 115-*c* may identify the second MCS which is to be used for transmission of the second sidelink message from a set of candidate MCSs based on the CSI (e.g., CSI sequence, joint NACK+CSI sequence) indicated within the feedback message.

Additionally, or alternatively, the first UE 115-*c* may transmit the second sidelink message within the retransmission resource which was reserved via the first sidelink message, via a second resource which is different from the retransmission resource, or both. In this regard, the second sidelink message may be transmitted/received within the previously-reserved retransmission resource, and/or via a different resource. For example, as shown in the resource allocation scheme 305-*b* illustrated in FIG. 3, the first UE 115-*c* may transmit the second sidelink message within at least a portion of the previously-reserved retransmission resource and at least a portion of a second resource, where the second resource is adjacent to a boundary of the retransmission resource in the frequency domain.

By way of another example, as shown in the resource allocation scheme 305-*c* illustrated in FIG. 3, the first UE 115-*c* may transmit the second sidelink message within a second resource which is separated from the retransmission resource in the frequency domain by one or more subchannels, and where the second resource is associated with a different set of time resources as compared to the retransmission resource. In such cases, the first UE 115-*c* may "abandon" the retransmission resource, and may transmit the second sidelink message via the second resource based on identifying that another UE 115 (e.g., a third UE 115-*c*) has reserved resources which are adjacent to the originally reserved retransmission resource in the frequency domain.

Techniques described herein may enable the use of enhanced feedback signaling mechanisms for sidelink communications. In particular, by enabling the second UE 115-*d* (e.g., Rx UE 115) to include CSI within feedback messages transmitted in response to sidelink groupcast messages, techniques described herein may facilitate improved channel knowledge at the first UE 115-*c* (e.g., Tx UE 115), thereby enabling the first UE 115-*c* to adjust parameters (e.g., MCS) and/or resources used for sidelink retransmissions to improve a probability that retransmissions will be successfully received and decoded at the second UE 115-*d*. As such, techniques described herein may lead to more effective and reliable sidelink communications, as well as improved utilization of sidelink resources.

FIG. 5 shows a block diagram 500 of a device 505 that supports techniques for enhanced feedback and link adaptation for sidelink groupcast communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for enhanced feedback and link adaptation for sidelink groupcast communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for enhanced feedback and link adaptation for sidelink groupcast communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for enhanced feedback and link adaptation for sidelink groupcast communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for transmitting a first sidelink message via a sidelink channel using a first set of one or more communication parameters, the first sidelink message including data and a reservation for a retransmission resource of the sidelink channel for retransmission of the first sidelink message. The communications manager 520 may be configured as or otherwise support a means for receiving, from a second UE, a feedback message including a sequence that indicates a NACK for the first sidelink message, and including CSI associated with the sidelink channel. The communications manager 520 may be configured as or otherwise support a means for transmitting a second sidelink message including the data of the first sidelink message based on the feedback message, where the second sidelink message is transmitted using a second set of one or more communication parameters different from the first set of one or more communication parameters, or via at least a second resource different from the retransmission resource, or both.

Additionally or alternatively, the communications manager 520 may support wireless communication at a second UE in accordance with examples as disclosed herein. For example, the communications manager 520 may be configured as or otherwise support a means for receiving, from a first UE, a first sidelink message via a sidelink channel using a first set of one or more communication parameters, the first sidelink message including data and a reservation for a retransmission resource of the sidelink channel for retransmission of the first sidelink message. The communications manager 520 may be configured as or otherwise support a means for transmitting, to the first UE, a feedback message including a sequence that indicates a NACK for the first sidelink message, and including CSI associated with the sidelink channel. The communications manager 520 may be configured as or otherwise support a means for receiving, from the first UE, a second sidelink message including the data of the first sidelink message based on the feedback message, where the second sidelink message is received using a second set of one or more communication parameters different from the first set of one or more communication parameters, or via at least a second resource different from the retransmission resource, or both.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for enhanced feedback signaling mechanisms for sidelink communications. In particular, by enabling the second UE 115-*d* (e.g., Rx UE 115) to include CSI within feedback messages transmitted in response to sidelink groupcast messages, techniques described herein may facilitate improved channel knowledge at the first UE 115-*c* (e.g., Tx UE 115), thereby enabling the first UE 115-*c* to adjust parameters (e.g., MCS) and/or resources used for sidelink retransmissions to improve a probability that retransmissions will be successfully received and decoded at the second UE 115-*d*. As such, techniques described herein may lead to more effective and reliable sidelink communications, as well as improved utilization of sidelink resources.

Figure 6:
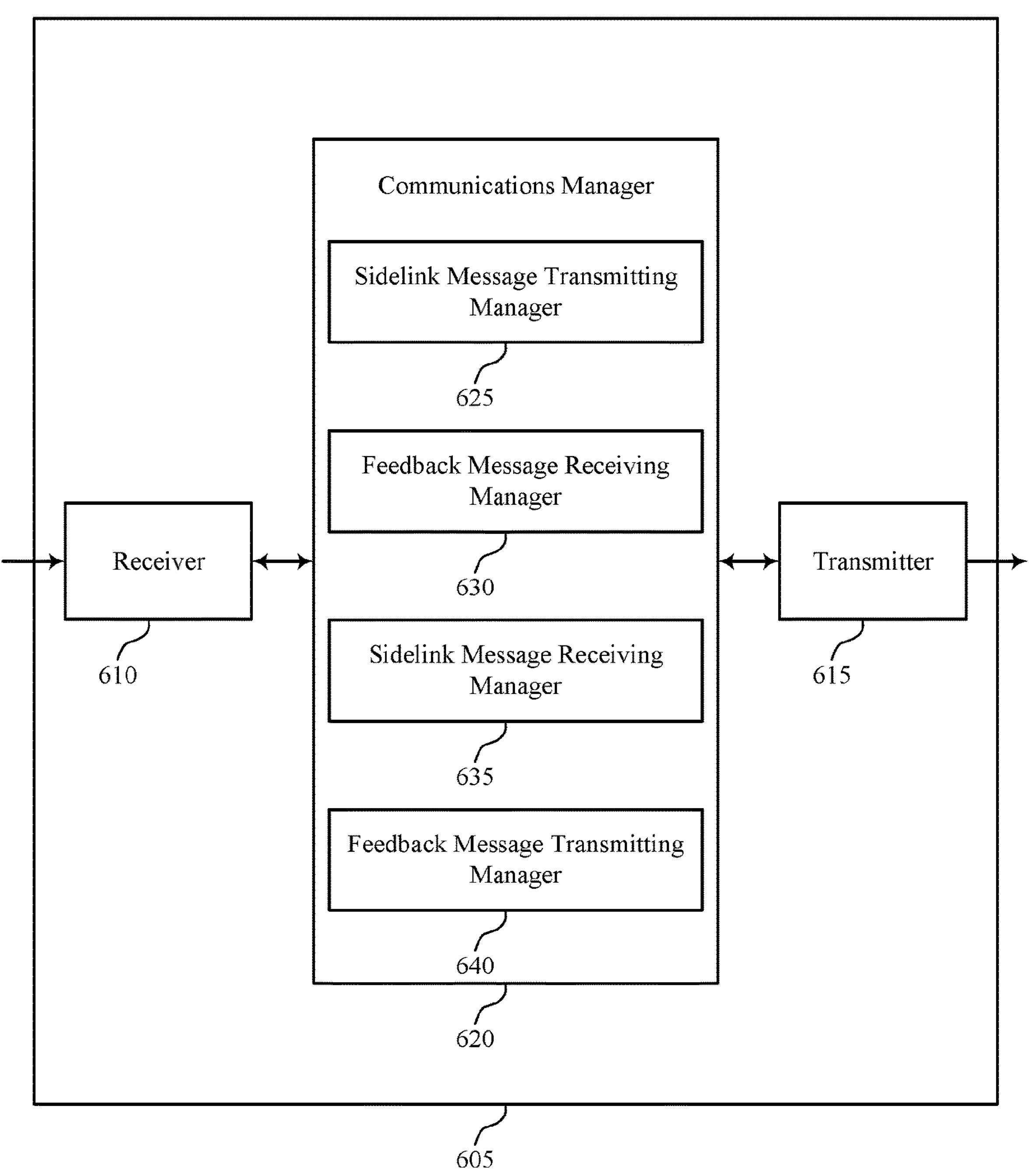

FIG. 6 shows a block diagram 600 of a device 605 that supports techniques for enhanced feedback and link adaptation for sidelink groupcast communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for enhanced feedback and link adaptation for sidelink groupcast communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for enhanced feedback and link adaptation for sidelink groupcast communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for enhanced feedback and link adaptation for sidelink groupcast communications as described herein. For example, the communications manager 620 may include a sidelink message transmitting manager 625, a feedback message receiving manager 630, a sidelink message receiving manager 635, a feedback message transmitting manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The sidelink message transmitting manager 625 may be configured as or otherwise support a means for transmitting a first sidelink message via a sidelink channel using a first set of one or more communication parameters, the first sidelink message including data and a reservation for a retransmission resource of the sidelink channel for retransmission of the first sidelink message. The feedback message receiving manager 630 may be configured as or otherwise support a means for receiving, from a second UE, a feedback message including a sequence that indicates a NACK for the first sidelink message, and including CSI associated with the sidelink channel. The sidelink message transmitting manager 625 may be configured as or otherwise support a means for transmitting a second sidelink message including the data of the first sidelink message based on the feedback message, where the second sidelink message is transmitted using a second set of one or more communication parameters different from the first set of one or more communication parameters, or via at least a second resource different from the retransmission resource, or both.

Additionally or alternatively, the communications manager 620 may support wireless communication at a second UE in accordance with examples as disclosed herein. The sidelink message receiving manager 635 may be configured as or otherwise support a means for receiving, from a first UE, a first sidelink message via a sidelink channel using a first set of one or more communication parameters, the first sidelink message including data and a reservation for a retransmission resource of the sidelink channel for retransmission of the first sidelink message. The feedback message transmitting manager 640 may be configured as or otherwise support a means for transmitting, to the first UE, a feedback message including a sequence that indicates a NACK for the first sidelink message, and including CSI associated with the sidelink channel. The sidelink message receiving manager 635 may be configured as or otherwise support a means for receiving, from the first UE, a second sidelink message including the data of the first sidelink message based on the feedback message, where the second sidelink message is received using a second set of one or more communication parameters different from the first set of one or more communication parameters, or via at least a second resource different from the retransmission resource, or both.

Figure 7:
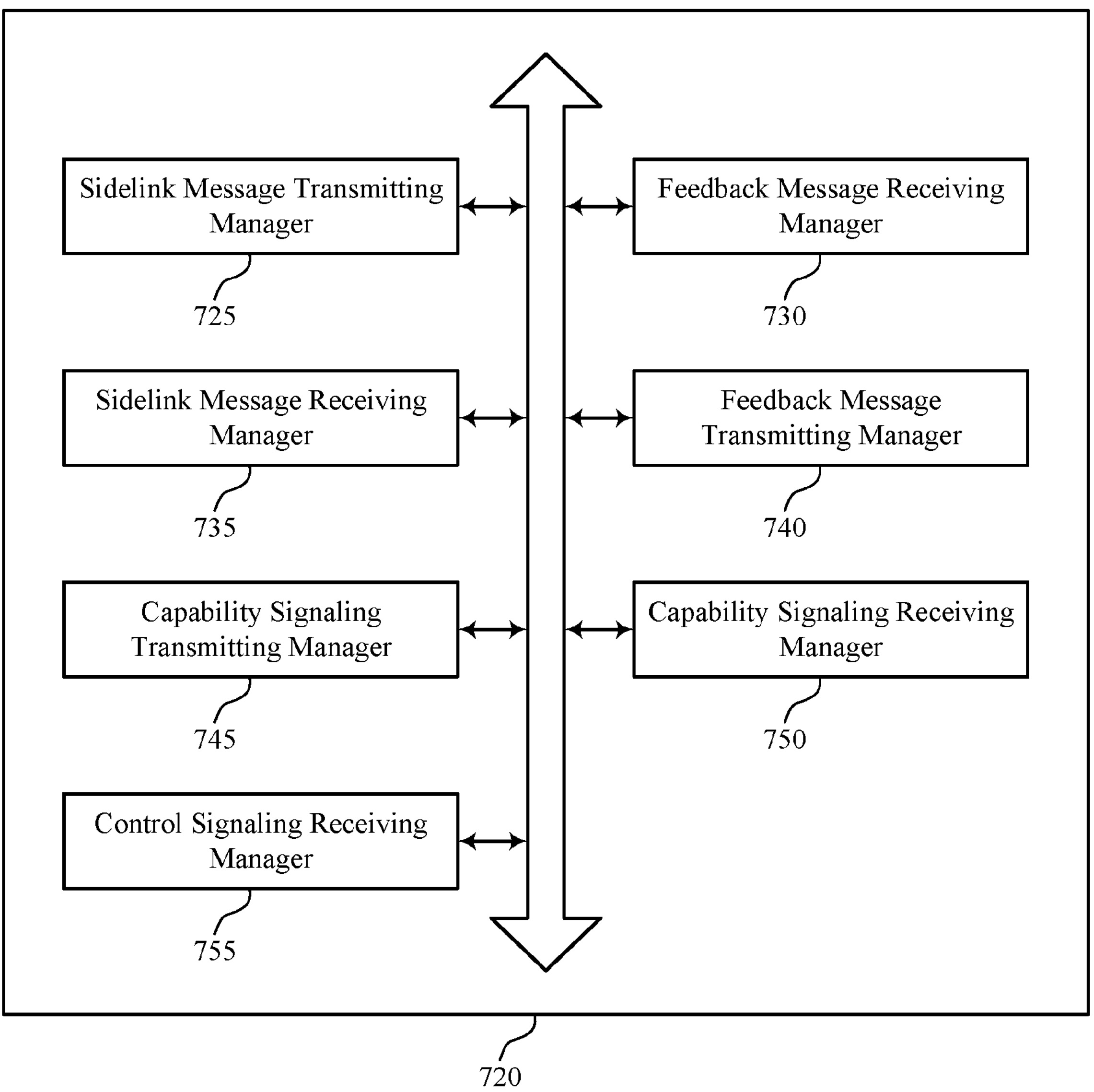
FIG. 7 shows a block diagram of a communications manager that supports techniques for enhanced feedback and link adaptation for sidelink groupcast communications in accordance with aspects of the present disclosure.

FIG. 7 shows a block diagram 700 of a communications manager 720 that supports techniques for enhanced feedback and link adaptation for sidelink groupcast communications in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for enhanced feedback and link adaptation for sidelink groupcast communications as described herein. For example, the communications manager 720 may include a sidelink message transmitting manager 725, a feedback message receiving manager 730, a sidelink message receiving manager 735, a feedback message transmitting manager 740, a capability signaling transmitting manager 745, a capability signaling receiving manager 750, a control signaling receiving manager 755, or any combination thereof. Each of these components may communicate, directly or indirectly, with one another (e.g., via one or more buses).

The communications manager 720 may support wireless communication at a first UE in accordance with examples as disclosed herein. The sidelink message transmitting manager 725 may be configured as or otherwise support a means for transmitting a first sidelink message via a sidelink channel using a first set of one or more communication parameters, the first sidelink message including data and a reservation for a retransmission resource of the sidelink channel for retransmission of the first sidelink message. The feedback message receiving manager 730 may be configured as or otherwise support a means for receiving, from a second UE, a feedback message including a sequence that indicates a NACK for the first sidelink message, and including CSI associated with the sidelink channel. In some examples, the sidelink message transmitting manager 725 may be configured as or otherwise support a means for transmitting a second sidelink message including the data of the first sidelink message based on the feedback message, where the second sidelink message is transmitted using a second set of one or more communication parameters different from the first set of one or more communication parameters, or via at least a second resource different from the retransmission resource, or both.

In some examples, the feedback message receiving manager 730 may be configured as or otherwise support a means for receiving, via the feedback message and in addition to the sequence that indicates the NACK, a CSI sequence included within a set of multiple CSI sequences, where the CSI sequence includes the CSI, and where transmitting the second sidelink message is based on the sequence that indicates the NACK, the CSI sequence, or both.

In some examples, the control signaling receiving manager 755 may be configured as or otherwise support a means for receiving, from a base station, control signaling indicating a set of feedback sequences for feedback messages associated with sidelink communications, the set of feedback sequences including the sequence that indicates the NACK and the set of multiple CSI sequences.

In some examples, each CSI sequence of the set of multiple CSI sequences is orthogonal to the sequence that indicates the NACK. In some examples, each CSI sequence of the set of multiple CSI sequences corresponds to a respective CSI report from a set of multiple CSI reports associated with the sidelink channel. In some examples, the sequence that indicates the NACK includes the CSI sequence for the CSI. In some examples, the feedback message includes a superposition of the sequence that indicates the NACK and the CSI sequence.

In some examples, the capability signaling transmitting manager 745 may be configured as or otherwise support a means for transmitting, to the second UE, an indication of a capability of the first UE to receive feedback messages including both feedback and CSI, where receiving the feedback message is based on transmitting the indication of the capability.

In some examples, the capability signaling transmitting manager 745 may be configured as or otherwise support a means for transmitting the indication of the capability via an SCI portion of the first sidelink message, a MAC-CE message, or any combination thereof.

In some examples, the first set of one or more communication parameters includes a first MCS, and the sidelink message transmitting manager 725 may be configured as or otherwise support a means for transmitting the second sidelink message using a second MCS which is different from the first MCS, where the second set of one or more communication parameters includes the second MCS. In some examples, the sidelink message transmitting manager 725 may be configured as or otherwise support a means for transmitting the second sidelink message using the second MCS based on the second MCS enabling the second sidelink message to be transmitted within the retransmission resource for retransmissions of the first sidelink message, where the second MCS is identified from a set of multiple candidate MCSs based on the CSI within the feedback message.

In some examples, the sidelink message transmitting manager 725 may be configured as or otherwise support a means for transmitting the second sidelink message within at least a portion of the retransmission resource and at least a portion of the second resource, where the second resource is adjacent to a boundary of the retransmission resource in a frequency domain. In some examples, the sidelink message transmitting manager 725 may be configured as or otherwise support a means for transmitting the second sidelink message via the second resource based on identifying that one or more resources which are adjacent to the retransmission resource in a frequency domain have been reserved by another UE. In some examples, the second resource is separated from the retransmission resource in the frequency domain by one or more subchannels. In some examples, the second resource is associated with a different set of time resources relative to the retransmission resource, or both. In some examples, the first sidelink message, the second sidelink message, or both, includes a sidelink groupcast message which is transmitted to a set of multiple UEs including the second UE.

Additionally or alternatively, the communications manager 720 may support wireless communication at a second UE in accordance with examples as disclosed herein. The sidelink message receiving manager 735 may be configured as or otherwise support a means for receiving, from a first UE, a first sidelink message via a sidelink channel using a first set of one or more communication parameters, the first sidelink message including data and a reservation for a retransmission resource of the sidelink channel for retransmission of the first sidelink message. The feedback message transmitting manager 740 may be configured as or otherwise support a means for transmitting, to the first UE, a feedback message including a sequence that indicates a NACK for the first sidelink message, and including CSI associated with the sidelink channel. In some examples, the sidelink message receiving manager 735 may be configured as or otherwise support a means for receiving, from the first UE, a second sidelink message including the data of the first sidelink message based on the feedback message, where the second sidelink message is received using a second set of one or more communication parameters different from the first set of one or more communication parameters, or via at least a second resource different from the retransmission resource, or both.

In some examples, the feedback message transmitting manager 740 may be configured as or otherwise support a means for transmitting, via the feedback message and in addition to the sequence that indicates the NACK, a CSI sequence included within a set of multiple CSI sequences, where the CSI sequence includes the CSI, and where receiving the second sidelink message is based on the sequence that indicates the NACK, the CSI sequence, or both.

In some examples, the control signaling receiving manager 755 may be configured as or otherwise support a means for receiving, from a base station, control signaling indicating a set of feedback sequences for feedback messages associated with sidelink communications, the set of feedback sequences including the sequence that indicates the NACK and the set of multiple CSI sequences.

In some examples, each CSI sequence of the set of multiple CSI sequences is orthogonal to the sequence that indicates the NACK. In some examples, each CSI sequence of the set of multiple CSI sequences corresponds to a respective CSI report from a set of multiple CSI reports associated with the sidelink channel. In some examples, the sequence that indicates the NACK includes the CSI sequence for the CSI. In some examples, the feedback message includes a superposition of the sequence that indicates the NACK and the CSI sequence.

In some examples, the capability signaling receiving manager 750 may be configured as or otherwise support a means for receiving, from the first UE, an indication of a capability of the first UE to receive feedback messages including both feedback and CSI, where transmitting the feedback message is based on transmitting the indication of the capability. In some examples, the capability signaling receiving manager 750 may be configured as or otherwise support a means for receiving the indication of the capability via an SCI portion of the first sidelink message, a MAC-CE message, or any combination thereof.

In some examples, the first set of one or more communication parameters includes a first MCS, and the sidelink message receiving manager 735 may be configured as or otherwise support a means for receiving the second sidelink message using a second MCS which is different from the first MCS, where the second set of one or more communication parameters includes the second MCS. In some examples, the sidelink message receiving manager 735 may be configured as or otherwise support a means for receiving the second sidelink message using the second MCS based on the second MCS enabling the second sidelink message to be transmitted within the retransmission resource for retransmissions of the first sidelink message, where the second MCS is identified from a set of multiple candidate MCSs based on the CSI within the feedback message.

In some examples, the sidelink message receiving manager 735 may be configured as or otherwise support a means for receiving the second sidelink message within at least a portion of the retransmission resource and at least a portion of the second resource, where the second resource is adjacent to a boundary of the retransmission resource in a frequency domain. In some examples, the sidelink message receiving manager 735 may be configured as or otherwise support a means for receiving the second sidelink message via the second resource based on identifying that one or more resources which are adjacent to the retransmission resource in a frequency domain have been reserved by another UE. In some examples, the second resource is separated from the retransmission resource in the frequency domain by one or more subchannels. In some examples, the second resource is associated with a different set of time resources relative to the retransmission resource, or both. In some examples, the first sidelink message, the second sidelink message, or both, includes a sidelink groupcast message which is transmitted by the first UE to a set of multiple UEs including the second UE.

Figure 8:
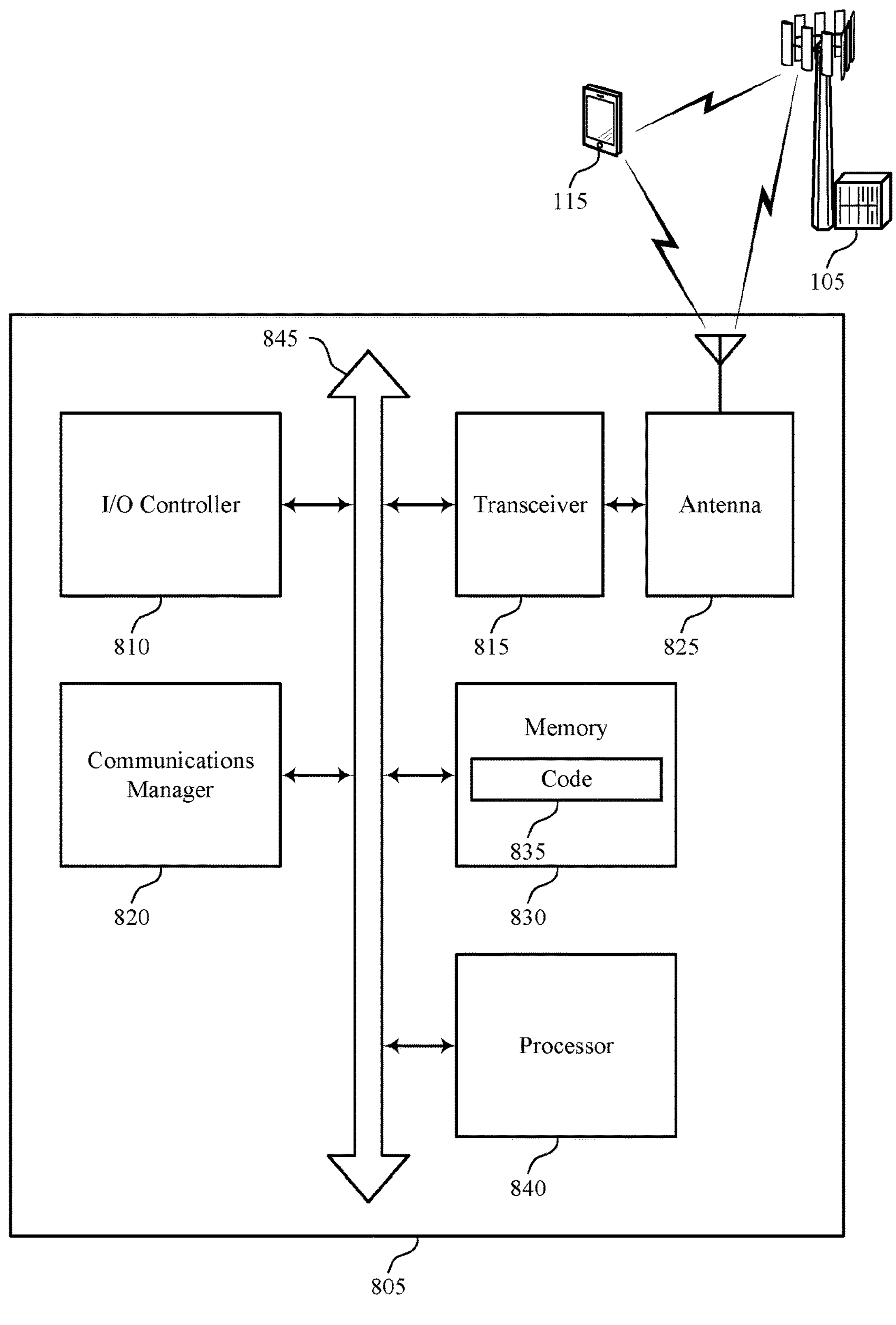
FIG. 8 shows a diagram of a system including a device that supports techniques for enhanced feedback and link adaptation for sidelink groupcast communications in accordance with aspects of the present disclosure.

FIG. 8 shows a diagram of a system 800 including a device 805 that supports techniques for enhanced feedback and link adaptation for sidelink groupcast communications in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bidirectional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for enhanced feedback and link adaptation for sidelink groupcast communications). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for transmitting a first sidelink message via a sidelink channel using a first set of one or more communication parameters, the first sidelink message including data and a reservation for a retransmission resource of the sidelink channel for retransmission of the first sidelink message. The communications manager 820 may be configured as or otherwise support a means for receiving, from a second UE, a feedback message including a sequence that indicates a NACK for the first sidelink message, and including CSI associated with the sidelink channel. The communications manager 820 may be configured as or otherwise support a means for transmitting a second sidelink message including the data of the first sidelink message based on the feedback message, where the second sidelink message is transmitted using a second set of one or more communication parameters different from the first set of one or more communication parameters, or via at least a second resource different from the retransmission resource, or both.

Additionally or alternatively, the communications manager 820 may support wireless communication at a second UE in accordance with examples as disclosed herein. For example, the communications manager 820 may be configured as or otherwise support a means for receiving, from a first UE, a first sidelink message via a sidelink channel using a first set of one or more communication parameters, the first sidelink message including data and a reservation for a retransmission resource of the sidelink channel for retransmission of the first sidelink message. The communications manager 820 may be configured as or otherwise support a means for transmitting, to the first UE, a feedback message including a sequence that indicates a NACK for the first sidelink message, and including CSI associated with the sidelink channel. The communications manager 820 may be configured as or otherwise support a means for receiving, from the first UE, a second sidelink message including the data of the first sidelink message based on the feedback message, where the second sidelink message is received using a second set of one or more communication parameters different from the first set of one or more communication parameters, or via at least a second resource different from the retransmission resource, or both.

By including or configuring the communications manager 820 in accordance with examples as described herein, the device 805 may support techniques for enhanced feedback signaling mechanisms for sidelink communications. In particular, by enabling the second UE 115-*d* (e.g., Rx UE 115) to include CSI within feedback messages transmitted in response to sidelink groupcast messages, techniques described herein may facilitate improved channel knowledge at the first UE 115-*c* (e.g., Tx UE 115), thereby enabling the first UE 115-*c* to adjust parameters (e.g., MCS) and/or resources used for sidelink retransmissions to improve a probability that retransmissions will be successfully received and decoded at the second UE 115-*d*. As such, techniques described herein may lead to more effective and reliable sidelink communications, as well as improved utilization of sidelink resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for enhanced feedback and link adaptation for sidelink groupcast communications as described herein, or the processor 840 and the memory 830 may be otherwise configured to perform or support such operations.

FIG. 9 shows a flowchart illustrating a method 900 that supports techniques for enhanced feedback and link adaptation for sidelink groupcast communications in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include transmitting a first sidelink message via a sidelink channel using a first set of one or more communication parameters, the first sidelink message including data and a reservation for a retransmission resource of the sidelink channel for retransmission of the first sidelink message. The operations of 905 may be performed in accordance with examples as disclosed herein. In some examples, aspects of the operations of 905 may be performed by a sidelink message transmitting manager 725 as described with reference to FIG. 7.

At 910, the method may include receiving, from a second UE, a feedback message including a feedback sequence that indicates a NACK for the first sidelink message and CSI associated with the sidelink channel. The operations of 910 may be performed in accordance with examples as disclosed herein. In some examples, aspects of the operations of 910 may be performed by a feedback message receiving manager 730 as described with reference to FIG. 7.

At 915, the method may include transmitting a second sidelink message including the data of the first sidelink message based on the feedback message, where the second sidelink message is transmitted using a second set of one or more communication parameters different from the first set of one or more communication parameters, or via at least a second resource different from the retransmission resource, or both. The operations of 915 may be performed in accordance with examples as disclosed herein. In some examples, aspects of the operations of 915 may be performed by a sidelink message transmitting manager 725 as described with reference to FIG. 7.

Figure 10:
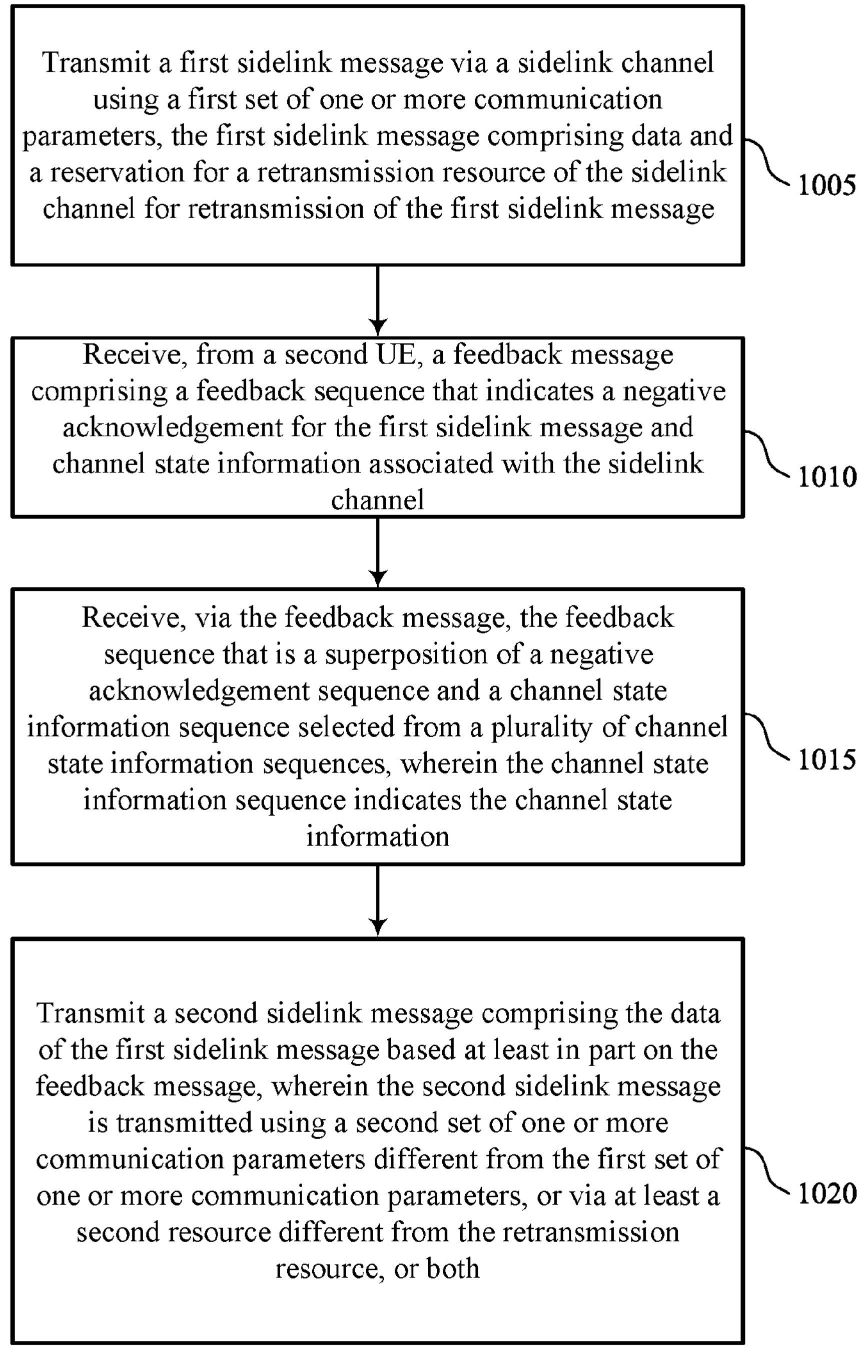

FIG. 10 shows a flowchart illustrating a method 1000 that supports techniques for enhanced feedback and link adaptation for sidelink groupcast communications in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include transmitting a first sidelink message via a sidelink channel using a first set of one or more communication parameters, the first sidelink message including data and a reservation for a retransmission resource of the sidelink channel for retransmission of the first sidelink message. The operations of 1005 may be performed in accordance with examples as disclosed herein. In some examples, aspects of the operations of 1005 may be performed by a sidelink message transmitting manager 725 as described with reference to FIG. 7.

At 1010, the method may include receiving, from a second UE, a feedback message including a feedback sequence that indicates a NACK for the first sidelink message and CSI associated with the sidelink channel. The operations of 1010 may be performed in accordance with examples as disclosed herein. In some examples, aspects of the operations of 1010 may be performed by a feedback message receiving manager 730 as described with reference to FIG. 7.

At 1015, the method may include receiving, via the feedback message, the feedback sequence that is a superposition of a NACK sequence and a CSI sequence selected from a set of multiple CSI sequences, where the CSI sequence indicates the CSI. The operations of 1015 may be performed in accordance with examples as disclosed herein. In some examples, aspects of the operations of 1015 may be performed by a feedback message receiving manager 730 as described with reference to FIG. 7.

At 1020, the method may include transmitting a second sidelink message including the data of the first sidelink message based on the feedback message, where the second sidelink message is transmitted using a second set of one or more communication parameters different from the first set of one or more communication parameters, or via at least a second resource different from the retransmission resource, or both. The operations of 1020 may be performed in accordance with examples as disclosed herein. In some examples, aspects of the operations of 1020 may be performed by a sidelink message transmitting manager 725 as described with reference to FIG. 7.

Figure 11:
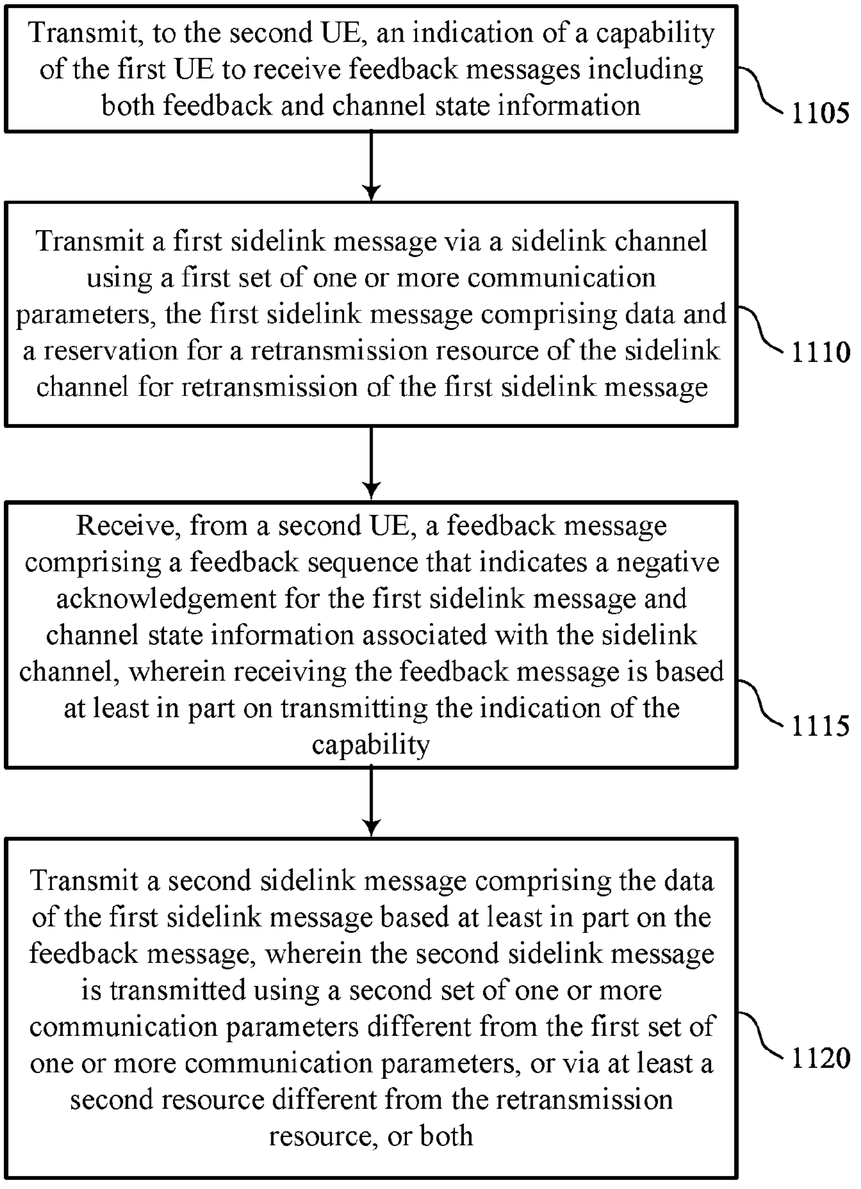

FIG. 11 shows a flowchart illustrating a method 1100 that supports techniques for enhanced feedback and link adaptation for sidelink groupcast communications in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include transmitting, to the second UE, an indication of a capability of the first UE to receive feedback messages including both feedback and CSI. The operations of 1105 may be performed in accordance with examples as disclosed herein. In some examples, aspects of the operations of 1105 may be performed by a capability signaling transmitting manager 745 as described with reference to FIG. 7.

At 1110, the method may include transmitting a first sidelink message via a sidelink channel using a first set of one or more communication parameters, the first sidelink message including data and a reservation for a retransmission resource of the sidelink channel for retransmission of the first sidelink message. The operations of 1110 may be performed in accordance with examples as disclosed herein. In some examples, aspects of the operations of 1110 may be performed by a sidelink message transmitting manager 725 as described with reference to FIG. 7.

At 1115, the method may include receiving, from a second UE, a feedback message including a feedback sequence that indicates a NACK for the first sidelink message and CSI associated with the sidelink channel, where receiving the feedback message is based on transmitting the indication of the capability. The operations of 1115 may be performed in accordance with examples as disclosed herein. In some examples, aspects of the operations of 1115 may be performed by a feedback message receiving manager 730 as described with reference to FIG. 7.

At 1120, the method may include transmitting a second sidelink message including the data of the first sidelink message based on the feedback message, where the second sidelink message is transmitted using a second set of one or more communication parameters different from the first set of one or more communication parameters, or via at least a second resource different from the retransmission resource, or both. The operations of 1120 may be performed in accordance with examples as disclosed herein. In some examples, aspects of the operations of 1120 may be performed by a sidelink message transmitting manager 725 as described with reference to FIG. 7.

Figure 12:
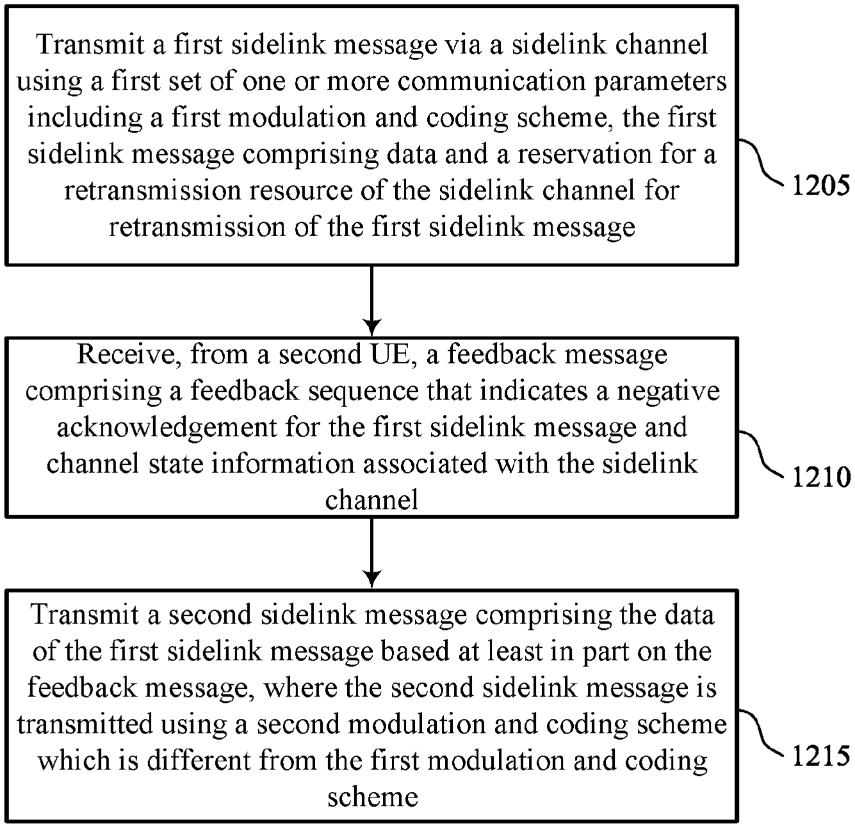

FIG. 12 shows a flowchart illustrating a method 1200 that supports techniques for enhanced feedback and link adaptation for sidelink groupcast communications in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include transmitting a first sidelink message via a sidelink channel using a first set of one or more communication parameters including a first MCS, the first sidelink message including data and a reservation for a retransmission resource of the sidelink channel for retransmission of the first sidelink message. The operations of 1205 may be performed in accordance with examples as disclosed herein. In some examples, aspects of the operations of 1205 may be performed by a sidelink message transmitting manager 725 as described with reference to FIG. 7.

At 1210, the method may include receiving, from a second UE, a feedback message including a feedback sequence that indicates a NACK for the first sidelink message and CSI associated with the sidelink channel. The operations of 1210 may be performed in accordance with examples as disclosed herein. In some examples, aspects of the operations of 1210 may be performed by a feedback message receiving manager 730 as described with reference to FIG. 7.

At 1215, the method may include transmitting a second sidelink message including the data of the first sidelink message based on the feedback message, where the second sidelink message is transmitted using a second MCS which is different from the first MCS. The operations of 1215 may be performed in accordance with examples as disclosed herein. In some examples, aspects of the operations of 1215 may be performed by a sidelink message transmitting manager 725 as described with reference to FIG. 7.

Figure 13:
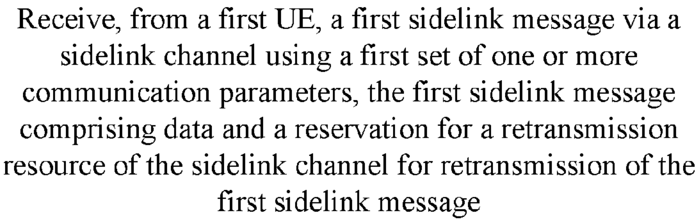

FIG. 13 shows a flowchart illustrating a method 1300 that supports techniques for enhanced feedback and link adaptation for sidelink groupcast communications in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a first UE, a first sidelink message via a sidelink channel using a first set of one or more communication parameters, the first sidelink message including data and a reservation for a retransmission resource of the sidelink channel for retransmission of the first sidelink message. The operations of 1305 may be performed in accordance with examples as disclosed herein. In some examples, aspects of the operations of 1305 may be performed by a sidelink message receiving manager 735 as described with reference to FIG. 7.

At 1310, the method may include transmitting, to the first UE, a feedback message including a feedback sequence that indicates a NACK for the first sidelink message and CSI associated with the sidelink channel. The operations of 1310 may be performed in accordance with examples as disclosed herein. In some examples, aspects of the operations of 1310 may be performed by a feedback message transmitting manager 740 as described with reference to FIG. 7.

At 1315, the method may include receiving, from the first UE, a second sidelink message including the data of the first sidelink message based on the feedback message, where the second sidelink message is received using a second set of one or more communication parameters different from the first set of one or more communication parameters, or via at least a second resource different from the retransmission resource, or both. The operations of 1315 may be performed in accordance with examples as disclosed herein. In some examples, aspects of the operations of 1315 may be performed by a sidelink message receiving manager 735 as described with reference to FIG. 7.

The following provides an overview of aspects of the present disclosure:

Aspect 1: A method for wireless communication at a first UE, comprising: transmitting a first sidelink message via a sidelink channel using a first set of one or more communication parameters, the first sidelink message comprising data and a reservation for a retransmission resource of the sidelink channel for retransmission of the first sidelink message; receiving, from a second UE, a feedback message comprising a feedback sequence that indicates a NACK for the first sidelink message and CSI associated with the sidelink channel; and transmitting a second sidelink message comprising the data of the first sidelink message based at least in part on the feedback message, wherein the second sidelink message is transmitted using a second set of one or more communication parameters different from the first set of one or more communication parameters, or via at least a second resource different from the retransmission resource, or both.

Aspect 2: The method of aspect 1, further comprising: receiving, via the feedback message, the feedback sequence that is a superposition of a negative acknowledgment sequence and a CSI sequence selected from a plurality of CSI sequences, wherein the CSI sequence indicates the CSI.

Aspect 3: The method of aspect 2, further comprising: receiving, from a base station, control signaling indicating a set of feedback sequences for feedback messages associated with sidelink communications, wherein the set of feedback sequences includes the feedback sequence, and wherein each feedback sequence in the set of feedback sequences indicates the NACK and a different CSI report from a plurality of CSI reports.

Aspect 4: The method of any of aspects 2 through 3, wherein each CSI sequence of the plurality of CSI sequences is orthogonal to the NACK sequence, and each CSI sequence of the plurality of CSI sequences corresponds to a respective CSI report from a plurality of CSI reports associated with the sidelink channel.

Aspect 5: The method of any of aspects 1 through 4, wherein the feedback sequence jointly indicates the NACK and the CSI, or the feedback sequence comprises a superposition of a NACK sequence and a CSI sequence.

Aspect 6: The method of any of aspects 1 through 5, further comprising: transmitting, to the second UE, an indication of a capability of the first UE to receiving feedback messages including both feedback and CSI, wherein receiving the feedback message is based at least in part on transmitting the indication of the capability.

Aspect 7: The method of aspect 6, further comprising: transmitting the indication of the capability via an SCI portion of the first sidelink message, a MAC-CE message, or any combination thereof.

Aspect 8: The method of any of aspects 1 through 7, wherein the first set of one or more communication parameters comprises a first MCS, the method further comprising: transmitting the second sidelink message using a second MCS which is different from the first MCS, wherein the second set of one or more communication parameters comprises the second MCS.

Aspect 9: The method of aspect 8, further comprising: transmitting the second sidelink message using the second MCS based at least in part on the second MCS enabling the second sidelink message to be transmitted within the retransmission resource for retransmissions of the first sidelink message, wherein the second MCS is identified from a plurality of candidate MCSs based at least in part on the CSI within the feedback message.

Aspect 10: The method of any of aspects 1 through 9, further comprising: transmitting the second sidelink message within at least a portion of the retransmission resource and at least a portion of the second resource, wherein the second resource is adjacent to a boundary of the retransmission resource in a frequency domain.

Aspect 11: The method of any of aspects 1 through 10, further comprising: transmitting the second sidelink message via the second resource based at least in part on identifying that one or more resources which are adjacent to the retransmission resource in a frequency domain have been reserved by another UE.

Aspect 12: The method of aspect 11, wherein the second resource is separated from the retransmission resource in the frequency domain by one or more subchannels, and the second resource is associated with a different set of time resources relative to the retransmission resource, or both.

Aspect 13: The method of any of aspects 1 through 12, wherein the first sidelink message, the second sidelink message, or both, comprises a sidelink groupcast message which is transmitted to a plurality of UEs including the second UE.

Aspect 14: A method for wireless communication at a second UE, comprising: receiving, from a first UE, a first sidelink message via a sidelink channel using a first set of one or more communication parameters, the first sidelink message comprising data and a reservation for a retransmission resource of the sidelink channel for retransmission of the first sidelink message; transmitting, to the first UE, a feedback message comprising a feedback sequence that indicates a NACK for the first sidelink message and CSI associated with the sidelink channel; and receiving, from the first UE, a second sidelink message comprising the data of the first sidelink message based at least in part on the feedback message, wherein the second sidelink message is received using a second set of one or more communication parameters different from the first set of one or more communication parameters, or via at least a second resource different from the retransmission resource, or both.

Aspect 15: The method of aspect 14, further comprising: transmitting, via the feedback message, the feedback sequence that is a superposition of a NACK sequence and a CSI sequence selected from a plurality of CSI sequences, wherein the CSI sequence indicates the CSI.

Aspect 16: The method of aspect 15, further comprising: receiving, from a base station, control signaling indicating a set of feedback sequences for feedback messages associated with sidelink communications, wherein the set of feedback sequences includes the feedback sequence, and wherein each feedback sequence in the set of feedback sequences indicates the NACK and a different CSI report from a plurality of CSI reports.

Aspect 17: The method of any of aspects 15 through 16, wherein each CSI sequence of the plurality of CSI sequences is orthogonal to the NACK sequence, and each CSI sequence of the plurality of CSI sequences corresponds to a respective CSI report from a plurality of CSI reports associated with the sidelink channel.

Aspect 18: The method of any of aspects 14 through 17, wherein the feedback sequence jointly indicates the NACK and the CSI, or the feedback sequence comprises a superposition of a NACK sequence and a CSI sequence.

Aspect 19: The method of any of aspects 14 through 18, further comprising: receiving, from the first UE, an indication of a capability of the first UE to receiving feedback messages including both feedback and CSI, wherein transmitting the feedback message is based at least in part on transmitting the indication of the capability.

Aspect 20: The method of aspect 19, further comprising: receiving the indication of the capability via an SCI portion of the first sidelink message, a MAC-CE message, or any combination thereof.

Aspect 21: The method of any of aspects 14 through 20, wherein the first set of one or more communication parameters comprises a first MCS, the method further comprising: receiving the second sidelink message using a second MCS which is different from the first MCS, wherein the second set of one or more communication parameters comprises the second MCS.

Aspect 22: The method of aspect 21, further comprising: receiving the second sidelink message using the second MCS based at least in part on the second MCS enabling the second sidelink message to be transmitted within the retransmission resource for retransmissions of the first sidelink message, wherein the second MCS is identified from a plurality of candidate MCSs based at least in part on the CSI within the feedback message.

Aspect 23: The method of any of aspects 14 through 22, further comprising: receiving the second sidelink message within at least a portion of the retransmission resource and at least a portion of the second resource, wherein the second resource is adjacent to a boundary of the retransmission resource in a frequency domain.

Aspect 24: The method of any of aspects 14 through 23, further comprising: receiving the second sidelink message via the second resource based at least in part on identifying that one or more resources which are adjacent to the retransmission resource in a frequency domain have been reserved by another UE.

Aspect 25: The method of aspect 24, wherein the second resource is separated from the retransmission resource in the frequency domain by one or more subchannels, and the second resource is associated with a different set of time resources relative to the retransmission resource, or both.

Aspect 26: The method of any of aspects 14 through 25, wherein the first sidelink message, the second sidelink message, or both, comprises a sidelink groupcast message which is transmitted by the first UE to a plurality of UEs including the second UE.

Aspect 27: An apparatus for wireless communication at a first UE, comprising a processor; memory coupled with the processor; and instructions stored in the memory and executable by the processor to cause the apparatus to perform a method of any of aspects 1 through 13.

Aspect 28: An apparatus for wireless communication at a first UE, comprising at least one means for performing a method of any of aspects 1 through 13.

Aspect 29: A non-transitory computer-readable medium storing code for wireless communication at a first UE, the code comprising instructions executable by a processor to perform a method of any of aspects 1 through 13.

Aspect 30: An apparatus for wireless communication at a second UE, comprising a processor; memory coupled with the processor; and instructions stored in the memory and executable by the processor to cause the apparatus to perform a method of any of aspects 14 through 26.

Aspect 31: An apparatus for wireless communication at a second UE, comprising at least one means for performing a method of any of aspects 14 through 26.

Aspect 32: A non-transitory computer-readable medium storing code for wireless communication at a second UE, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first user equipment (UE) for wireless communication, comprising:

at least one processor;

at least one memory coupled with the at least one processor; and instructions stored in the at least one memory, and executable by the at least one processor to cause the first UE to:

transmit a first sidelink message via a sidelink channel using a first set of one or more communication parameters, the first sidelink message comprising data and a reservation for a retransmission resource of the sidelink channel for retransmission of the first sidelink message;

receive, from a second UE, a feedback message comprising a feedback sequence, the feedback sequence indicative of both of a negative acknowledgement for the first sidelink message and channel state information associated with the sidelink channel; and transmit a second sidelink message comprising the data of the first sidelink message based at least in part on the feedback message, wherein the second sidelink message is transmitted using a second set of one or more communication parameters different from the first set of one or more communication parameters, or via at least a second resource different from the retransmission resource, or both.

2. The first UE of claim 1, wherein the instructions are further executable by the at least one processor to cause the first UE to:

receive, via the feedback message, the feedback sequence that is a superposition of a negative acknowledgment sequence and a channel state information sequence selected from a plurality of channel state information sequences, wherein the channel state information sequence indicates the channel state information.

3. The first UE of claim 2, wherein the instructions are further executable by the at least one processor to cause the first UE to:

receive, from a base station, control signaling indicating a set of feedback sequences for feedback messages associated with sidelink communications, wherein the set of feedback sequences includes the feedback sequence, and wherein each feedback sequence in the set of feedback sequences indicates the negative acknowledgement and a different channel state information report from a plurality of channel state information reports.

4. The first UE of claim 2, wherein each channel state information sequence of the plurality of channel state information sequences is orthogonal to the negative acknowledgement sequence, and wherein each channel state information sequence of the plurality of channel state information sequences corresponds to a respective channel state information report from a plurality of channel state information reports associated with the sidelink channel.

5. The first UE of claim 1, wherein the feedback sequence jointly indicates the negative acknowledgement and the channel state information, or wherein the feedback sequence comprises a superposition of a negative acknowledgement sequence and a channel state information sequence.

6. The first UE of claim 1, wherein the instructions are further executable by the at least one processor to cause the first UE to:

transmit, to the second UE, an indication of a capability of the first UE to receive feedback messages including both feedback and channel state information, wherein receiving the feedback message is based at least in part on transmitting the indication of the capability.

7. The first UE of claim 6, wherein the instructions are further executable by the at least one processor to cause the first UE to:

transmit the indication of the capability via a sidelink control information portion of the first sidelink message, a medium access control-control element message, or any combination thereof.

8. The first UE of claim 1, wherein the first set of one or more communication parameters comprises a first modulation and coding scheme, and the instructions are further executable by the at least one processor to cause the first UE to:

transmit the second sidelink message using a second modulation and coding scheme which is different from the first modulation and coding scheme, wherein the second set of one or more communication parameters comprises the second modulation and coding scheme.

9. The first UE of claim 8, wherein the instructions are further executable by the at least one processor to cause the first UE to:

transmit the second sidelink message using the second modulation and coding scheme based at least in part on the second modulation and coding scheme enabling the second sidelink message to be transmitted within the retransmission resource for retransmissions of the first sidelink message, wherein the second modulation and coding scheme is identified from a plurality of candidate modulation and coding schemes based at least in part on the channel state information within the feedback message.

10. The first UE of claim 1, wherein the instructions are further executable by the at least one processor to cause the first UE to:

transmit the second sidelink message within at least a portion of the retransmission resource and at least a portion of the second resource, wherein the second resource is adjacent to a boundary of the retransmission resource in a frequency domain.

11. The first UE of claim 1, wherein the instructions are further executable by the at least one processor to cause the first UE to:

transmit the second sidelink message via the second resource based at least in part on identifying that one or more resources which are adjacent to the retransmission resource in a frequency domain have been reserved by another UE.

12. The first UE of claim 11, wherein the second resource is separated from the retransmission resource in the frequency domain by one or more subchannels, and wherein the second resource is associated with a different set of time resources relative to the retransmission resource, or both.

13. The first UE of claim 1, wherein the first sidelink message, the second sidelink message, or both, comprises a sidelink groupcast message which is transmitted to a plurality of UEs including the second UE.

14. A second user equipment (UE) for wireless communication, comprising:

at least one processor;

at least one memory coupled with the at least one processor; and instructions stored in the at least one memory and executable by the at least one processor to cause the second UE to:

receive, from a first UE, a first sidelink message via a sidelink channel using a first set of one or more communication parameters, the first sidelink message comprising data and a reservation for a retransmission resource of the sidelink channel for retransmission of the first sidelink message;

transmit, to the first UE, a feedback message comprising a feedback sequence, the feedback sequence indicative of both of a negative acknowledgement for the first sidelink message and channel state information associated with the sidelink channel; and receive, from the first UE, a second sidelink message comprising the data of the first sidelink message based at least in part on the feedback message, wherein the second sidelink message is received using a second set of one or more communication parameters different from the first set of one or more communication parameters, or via at least a second resource different from the retransmission resource, or both.

15. The second UE of claim 14, wherein the instructions are further executable by the at least one processor to cause the second UE to:

transmit, via the feedback message, the feedback sequence that is a superposition of a negative acknowledgement sequence and a channel state information sequence selected from a plurality of channel state information sequences, wherein the channel state information sequence indicates the channel state information.

16. The second UE of claim 15, wherein the instructions are further executable by the at least one processor to cause the second UE to:

receive, from a base station, control signaling indicating a set of feedback sequences for feedback messages associated with sidelink communications, wherein the set of feedback sequences includes the feedback sequence, and wherein each feedback sequence in the set of feedback sequences indicates the negative acknowledgement and a different channel state information report from a plurality of channel state information reports.

17. The second UE of claim 15, wherein each channel state information sequence of the plurality of channel state information sequences is orthogonal to the negative acknowledgement sequence, and wherein each channel state information sequence of the plurality of channel state information sequences corresponds to a respective channel state information report from a plurality of channel state information reports associated with the sidelink channel.

18. The second UE of claim 14, wherein the feedback sequence jointly indicates the negative acknowledgement and the channel state information, or wherein the feedback sequence comprises a superposition of a negative acknowledgement sequence and a channel state information sequence.

19. The second UE of claim 14, wherein the instructions are further executable by the at least one processor to cause the second UE to:

receive, from the first UE, an indication of a capability of the first UE to receive feedback messages including both feedback and channel state information, wherein transmitting the feedback message is based at least in part on transmitting the indication of the capability.

20. The second UE of claim 19, wherein the instructions are further executable by the at least one processor to cause the second UE to:

receive the indication of the capability via a sidelink control information portion of the first sidelink message, a medium access control-control element message, or any combination thereof.

21. The second UE of claim 14, wherein the first set of one or more communication parameters comprises a first modulation and coding scheme, and the instructions are further executable by the at least one processor to cause the second UE to:

receive the second sidelink message using a second modulation and coding scheme which is different from the first modulation and coding scheme, wherein the second set of one or more communication parameters comprises the second modulation and coding scheme.

22. The second UE of claim 21, wherein the instructions are further executable by the at least one processor to cause the second UE to:

receive the second sidelink message using the second modulation and coding scheme based at least in part on the second modulation and coding scheme enabling the second sidelink message to be transmitted within the retransmission resource for retransmissions of the first sidelink message, wherein the second modulation and coding scheme is identified from a plurality of candidate modulation and coding schemes based at least in part on the channel state information within the feedback message.

23. The second UE of claim 14, wherein the instructions are further executable by the at least one processor to cause the second UE to:

receive the second sidelink message within at least a portion of the retransmission resource and at least a portion of the second resource, wherein the second resource is adjacent to a boundary of the retransmission resource in a frequency domain.

24. The second UE of claim 14, wherein the instructions are further executable by the at least one processor to cause the second UE to:

receive the second sidelink message via the second resource based at least in part on identifying that one or more resources which are adjacent to the retransmission resource in a frequency domain have been reserved by another UE.

25. The second UE of claim 24, wherein the second resource is separated from the retransmission resource in the frequency domain by one or more subchannels, and wherein the second resource is associated with a different set of time resources relative to the retransmission resource, or both.

26. The second UE of claim 14, wherein the first sidelink message, the second sidelink message, or both, comprises a sidelink groupcast message which is transmitted by the first UE to a plurality of UEs including the second UE.

27. A method for wireless communication at a first user equipment (UE), comprising:

transmitting a first sidelink message via a sidelink channel using a first set of one or more communication parameters, the first sidelink message comprising data and a reservation for a retransmission resource of the sidelink channel for retransmission of the first sidelink message;

receiving, from a second UE, a feedback message comprising a feedback sequence, the feedback sequence indicative of both of a negative acknowledgement for the first sidelink message and channel state information associated with the sidelink channel; and transmitting a second sidelink message comprising the data of the first sidelink message based at least in part on the feedback message, wherein the second sidelink message is transmitted using a second set of one or more communication parameters different from the first set of one or more communication parameters, or via at least a second resource different from the retransmission resource, or both.

28. The method of claim 27, further comprising:

receiving, via the feedback message, the feedback sequence that is a superposition of a negative acknowledgement sequence and a channel state information sequence selected from a plurality of channel state information sequences, wherein the channel state information sequence indicates the channel state information.

29. The method of claim 27, further comprising:

transmitting, to the second UE, an indication of a capability of the first UE to receive feedback messages including both feedback and channel state information, wherein receiving the feedback message is based at least in part on transmitting the indication of the capability.

30. A method for wireless communication at a second user equipment (UE), comprising:

receiving, from a first UE, a first sidelink message via a sidelink channel using a first set of one or more communication parameters, the first sidelink message comprising data and a reservation for a retransmission resource of the sidelink channel for retransmission of the first sidelink message;

transmitting, to the first UE, a feedback message comprising a feedback sequence, the feedback sequence indicative of both of a negative acknowledgement for the first sidelink message and channel state information associated with the sidelink channel; and receiving, from the first UE, a second sidelink message comprising the data of the first sidelink message based at least in part on the feedback message, wherein the second sidelink message is received using a second set of one or more communication parameters different from the first set of one or more communication parameters, or via at least a second resource different from the retransmission resource, or both.

* * * * *